(12) United States Patent
Sartori et al.

(10) Patent No.: US 12,147,960 B2
(45) Date of Patent: *Nov. 19, 2024

(54) SYSTEMS AND METHODS FOR MOBILE POINT-OF-SALE TRANSACTIONS

(71) Applicant: SHOPIFY INC., Ottawa (CA)

(72) Inventors: Luke James Sartori, St. John's (CA); Daanish Maan, Brampton (CA); Peter Nitsch, Etobicoke (CA); Michael DeFazio, Fonthill (CA); Gregory Moore, Ottawa (CA); Silvana Zaldivar, Toronto (CA)

(73) Assignee: SHOPIFY INC., Ottawa (CA)

( * ) Notice: Subject to any disclaimer, the term of this patent is extended or adjusted under 35 U.S.C. 154(b) by 184 days.

This patent is subject to a terminal disclaimer.

(21) Appl. No.: 17/853,760

(22) Filed: Jun. 29, 2022

(65) Prior Publication Data

US 2022/0327509 A1 Oct. 13, 2022

Related U.S. Application Data

(63) Continuation of application No. 16/889,215, filed on Jun. 1, 2020, now Pat. No. 11,410,151.

(51) Int. Cl.
*G06Q 20/20* (2012.01)
*G06K 7/14* (2006.01)
*G06Q 30/0601* (2023.01)

(52) U.S. Cl.
CPC ......... *G06Q 20/206* (2013.01); *G06Q 20/201* (2013.01); *G06Q 20/202* (2013.01); *G06Q 20/203* (2013.01); *G06Q 30/0633* (2013.01); *G06K 7/1417* (2013.01)

(58) Field of Classification Search
CPC .. G06Q 20/206; G06Q 20/201; G06Q 20/202; G06Q 20/203; G06Q 30/0633; G06K 7/1417

See application file for complete search history.

(56) References Cited

U.S. PATENT DOCUMENTS

| 8,521,126 | B2 | 8/2013 | Bumiller et al. |
| 8,688,524 | B1 | 4/2014 | Ramalingam |
| 10,915,906 | B2 | 2/2021 | Keith |
| 2012/0203697 | A1* | 8/2012 | Morgan ............... G06Q 20/027 705/44 |
| 2012/0330769 | A1 | 12/2012 | Arceo |

(Continued)

OTHER PUBLICATIONS

Urien, Piramuthu, "Framework and Authentication Protocols for Smartphone, NFC, and RFID in Retail Transactions", 2013. 2013.

*Primary Examiner* — A. Hunter Wilder
(74) *Attorney, Agent, or Firm* — Smart & Biggar LP

(57) ABSTRACT

A method for processing a transaction at a mobile includes: receiving a product identifier of a product; and creating or updating an electronic shopping cart based on the product identifier of the product; receiving a request for performing a transaction task; in response to the request for performing the transaction task, determining a state of the mobile POS device; when the state of the mobile POS device is determined to be unlocked: performing the transaction task; and when the state of the mobile POS device is determined to be locked: rejecting the request for performing the transaction task. Related systems and devices are also disclosed.

25 Claims, 10 Drawing Sheets

(56) References Cited

U.S. PATENT DOCUMENTS

| | | | |
|---|---|---|---|
| 2015/0324780 A1* | 11/2015 | Smith | G06Q 20/206 |
| | | | 705/18 |
| 2015/0324789 A1 | 11/2015 | Dvorak et al. | |
| 2016/0071194 A1* | 3/2016 | Proulx | G06Q 30/0633 |
| | | | 705/26.8 |
| 2016/0306507 A1* | 10/2016 | Defazio | H04B 1/3827 |
| 2016/0379297 A1 | 12/2016 | Aspholm | |
| 2017/0287061 A1 | 10/2017 | Chae et al. | |
| 2019/0205917 A1 | 7/2019 | Ericson | |
| 2019/0266587 A1 | 8/2019 | Lin et al. | |
| 2023/0185892 A1* | 6/2023 | Hughes | H04L 9/0891 |
| | | | 713/182 |

* cited by examiner

SYSTEMS AND METHODS FOR MOBILE POINT-OF-SALE TRANSACTIONS

CROSS-REFERENCE TO RELATED APPLICATION

This application is a continuation of U.S. patent application Ser. No. 16/889,215, filed Jun. 1, 2020, entitled SYSTEMS AND METHODS FOR MOBILE POINT-OF-SALE TRANSACTIONS, the contents of which are hereby expressly incorporated into the present application by reference in their entirety.

FIELD

The present disclosure relates to point-of-sale systems, and, more specifically, to facilitating point-of-sale transactions performed using a mobile point-of-sale device.

BACKGROUND

A mobile point-of-sale (POS) device or terminal is a mobile device (e.g. a smartphone, tablet or a customized device) that is configured to perform functions of a cash register wirelessly, and is often small enough that an individual can carry it around.

In a physical retail store, when a retail staff member is using a mobile POS device to scan and build an electronic or virtual shopping cart (also referred to as a "cart" throughout the disclosure) for a customer during the retail shopping experience, the mobile POS system typically requires the staff to log into a backend system to ensure that only authorized agents of the retail store are using the mobile POS device and to track appropriate attributions (e.g., sales attribution). In addition, as a retail staff member carries around the mobile POS device, there is often a need for access to advanced functions such as checking inventory count for an item, or performing a checkout action for an existing cart, which may also require a secure login by the staff. There are also self-scanning POS terminals ("self-checkouts") where the customer scans and builds a cart, however those POS systems are often limited to strictly scanning and paying for scanned items, and do not provide advanced functions such as inventory scanning, setting sales attributions, or conducting cross-shop inventory searches.

SUMMARY

The examples described herein may be implemented in the context of an e-commerce platform, or may be made available for use outside of the e-commerce platform, such as in a physical retail store.

The examples described herein may enable the implementation of an intermediary state for a POS device, where a user (e.g. a retail staff member) can create or build a cart for a customer without having to log into the POS system, thereby facilitating a seamless process to build an electronic shopping cart for a customer in a physical store without the friction of login. The POS system can prompt for or allow a login process during a pause in the staff-customer communication, where the staff may log into the system to check out or continue the cart building. In this way, the POS device may facilitate seamless creation and update of an electronic shopping cart while maintaining security of the POS device.

In one aspect, there is provided a method for processing a transaction at a mobile POS device, the method includes: receiving, by a mobile POS device, a product identifier of a product; updating an electronic shopping cart based on the product identifier of the product; receiving a request for performing a transaction task; in response to the request for performing the transaction task, determining a state of the mobile POS device; when the state of the mobile POS device is determined to be unlocked: performing the transaction task; and when the state of the mobile POS device is determined to be locked: rejecting the request for performing the transaction task.

In some example embodiments, updating the electronic shopping cart based on the product identifier of the product may include: retrieving, from a product database, product information of the product based on the product identifier, the product information including at least a price and a description of the product; displaying the product information of the product on a display of the mobile POS device as part of the electronic shopping cart; adding the product to the electronic shopping cart; and calculating and displaying a total payment amount due for the electronic shopping cart based on the price of the product.

In some example embodiments, when the state of the mobile POS device is determined to be locked, the method may include displaying a message on the mobile POS device requesting authentication information from a user.

In some example embodiments, the method may include, when the state of the mobile POS device is determined to be locked: receiving the authentication information; verifying the authentication information; updating the state of the mobile POS device to unlocked; and performing the transaction task.

In some example embodiments, the method may include: receiving an electronic signal to set the mobile POS device to a POS mode; and responsive to the electronic signal, setting a mode of the mobile POS device to the POS mode to receive product identifiers.

In some example embodiments, the electronic signal is generated responsive to a press of a key or button of the mobile POS device.

In some example embodiments, the method may include: detecting that the electronic shopping cart has been pending for a defined duration during which the mobile POS device remained in the locked state; and responsive to detecting that the electronic shopping cart has been pending for the defined duration during which the mobile POS device remained in the locked state, removing the electronic shopping cart from a checkout queue.

In some example embodiments, the method may include removing the electronic shopping cart from a checkout queue responsive to receiving a user command from the mobile POS device.

In some example embodiments, the method may include storing data of the electronic shopping cart prior to the removal of the electronic shopping cart, where the data of the electronic shopping cart may include one or more of: production information of one or more items in the electronic shopping cart, a location of the POS device, a timestamp associated with the electronic shopping cart, a sales attribution value associated with the electronic shopping cart, or a customer profile associated with the electronic shopping cart.

In some example embodiments, the transaction task may include one of: initializing a checkout transaction; processing a checkout process; retrieving or updating an inventory status for one or more products; retrieving customer information; initiating or requesting an order assessment; initiating or requesting an order fulfillment; assigning or updating a sales attribution value; or sending the electronic shopping cart to a remote device for processing.

In some example embodiments, the method may include, when the state of the mobile POS device is unlocked: determining a state of the remote device; and sending the electronic shopping cart to the remote device only when the state of the remote device is unlocked.

In some example embodiments, when the state of the remote device is unlocked, the electronic shopping cart is sent to the remote device with a sales attribution value.

In some example embodiments, the mobile POS device has a camera, and the method may include: capturing an image, by the camera, of a machine-readable code associated with the product; and determining the product identifier based on the machine-readable code.

In some example embodiments, the machine-readable code may be a bar code or QR code.

In one aspect, there is provided a system for processing a transaction, the system may include a mobile POS device having a processor in communication with an non-transient computer readable medium, the computer readable medium having instructions stored thereon, and the processor configured to, when executing the instructions: receive, by the mobile POS device, a product identifier of a product; update an electronic shopping cart based on the product identifier of the product; receive a request for performing a transaction task; in response to the request for performing the transaction task, determine a state of the mobile POS device; when the state of the mobile POS device is determined to be unlocked: perform the transaction task; and when the state of the mobile POS device is determined to be locked: reject the request for performing the transaction task.

In some example embodiments, the mobile POS device may include a camera.

In some example embodiments, the non-transient computer readable medium may be a remote storage device that can communicate with the processor of the mobile POS device via a network connection such as a wireless network.

In some example embodiments, updating the electronic shopping cart based on the product identifier of the product may include: retrieving, from a product database, product information of the product based on the product identifier, the product information including at least a price and a description of the product; displaying the product information of the product on a display of the mobile POS device as part of the electronic shopping cart; adding the product to the electronic shopping cart; and calculating and displaying a total payment amount due for the electronic shopping cart based on the price of the product.

In some example embodiments, the processor is configured to, when the state of the mobile POS device is determined to be locked: display a message on the mobile POS device requesting authentication information from a user.

In some example embodiments, the processor is configured to, when the state of the mobile POS device is determined to be locked: receive the authentication information; verify the authentication information; update the state of the mobile POS device to unlocked; and perform the transaction task.

In some example embodiments, the processor is configured to: receive an electronic signal to the mobile POS device to a POS mode; and set a mode of the mobile POS device to the POS mode to receive product identifiers.

In some example embodiments, electronic signal is generated responsive to a press of a key or button of the mobile POS device.

In some example embodiments, the processor is configured to: detect that the electronic shopping cart has been pending for a defined duration during which the mobile POS device remained in the locked state; and responsive to detecting that the electronic shopping cart has been pending for the defined duration during which the mobile POS device remained in the locked state, remove the electronic shopping cart from a checkout queue.

In some example embodiments, the system includes a mobile POS device and the processor is configured to remove the electronic shopping cart from a checkout queue responsive to receiving a user command from the mobile POS device.

In some example embodiments, the processor is configured to: store data of the electronic shopping cart prior to the removal of the electronic shopping cart; and the data of the electronic shopping cart may include one or more of: production information of one or more items in the electronic shopping cart, a location of the POS device, a timestamp associated with the electronic shopping cart, a sales attribution value associated with the electronic shopping cart, or a customer profile associated with the electronic shopping cart.

In some example embodiments, the transaction task includes one of: initializing a checkout transaction; processing a checkout process; retrieving or updating an inventory status for one or more products; retrieving customer information; initiating or requesting an order assessment; initiating or requesting an order fulfillment; assigning or updating a sales attribution value; or sending the electronic shopping cart to a remote device for processing.

In some example embodiments, when the state of the mobile POS device is unlocked, and when the transaction task is sending the electronic shopping cart to a remote device for processing, the processor is configured to: determine a state of the remote device; and send the electronic shopping cart to the remote device only when the state of the remote device is unlocked.

In some example embodiments, when the state of the remote device is unlocked, the processor is configured to send the electronic shopping cart to the remote device with a sales attribution value.

In some example embodiments, the system is a mobile POS device having a camera, and the processor is configured to: capture an image, by the camera, of a machine-readable code associated with the product; and determine the product identifier based on the machine-readable code.

In yet another aspect, there is provided a non-transitory computer readable medium having stored thereon instructions for processing a transaction at a mobile POS device, the instructions including machine executable code which when executed by at least one processor, causes the at least one processor to perform: receiving, by a mobile POS device, a product identifier of a product; updating an electronic shopping cart based on the product identifier of the product; receiving a request for performing a transaction task; in response to the request for performing the transaction task, determining a state of the mobile POS device; when the state of the mobile POS device is determined to be unlocked: performing the transaction task; and when the state of the mobile POS device is determined to be locked: rejecting the request for performing the transaction task.

In some example embodiments, updating the electronic shopping cart based on the product identifier of the product may include: retrieving, from a product database, product information of the product based on the product identifier, the product information including at least a price and a description of the product; displaying the product information of the product on a display of the mobile POS device as part of the electronic shopping cart; adding the product to the electronic shopping cart; and calculating and displaying a total payment amount due for the electronic shopping cart based on the price of the product.

In some example embodiments, when the state of the mobile POS device is determined to be locked, the instructions may cause the at least one processor to perform: displaying a message on the mobile POS device requesting authentication information from a user.

In some example embodiments, the instructions may cause the at least one processor to perform, when the state of the mobile POS device is determined to be locked: receiving the authentication information; verifying the authentication information; updating the state of the mobile POS device to unlocked; and performing the transaction task.

In some example embodiments, the instructions may cause the at least one processor to perform: receiving an electronic signal to set the mobile POS device to a POS mode; and responsive to the electronic signal, setting a mode of the mobile POS device to the POS mode to receive product identifiers.

In some example embodiments, the electronic signal is generated responsive to a press of a key or button of the mobile POS device.

In some example embodiments, the instructions may cause the at least one processor to perform: detecting that the electronic shopping cart has been pending for a defined duration during which the mobile POS device remained in the locked state; and responsive to detecting that the electronic shopping cart has been pending for the defined duration during which the mobile POS device remained in the locked state, removing the electronic shopping cart from a checkout queue.

In some example embodiments, the instructions may cause the at least one processor to remove the electronic shopping cart from a checkout queue responsive to receiving a user command from the mobile POS device.

In some example embodiments, the instructions may cause the at least one processor to perform: storing data of the electronic shopping cart prior to the removal of the electronic shopping cart, where the data of the electronic shopping cart may include one or more of: production information of one or more items in the electronic shopping cart, a location of the POS device, a timestamp associated with the electronic shopping cart, a sales attribution value associated with the electronic shopping cart, or a customer profile associated with the electronic shopping cart.

In some example embodiments, the transaction task may include one of: initializing a checkout transaction; processing a checkout process; retrieving or updating an inventory status for one or more products; retrieving customer information; initiating or requesting an order assessment; initiating or requesting an order fulfillment; assigning or updating a sales attribution value; or sending the electronic shopping cart to a remote device for processing.

In some example embodiments, the instructions may cause the at least one processor to perform, when the state of the mobile POS device is unlocked: determining a state of the remote device; and sending the electronic shopping cart to the remote device only when the state of the remote device is unlocked.

In some example embodiments, when the state of the remote device is unlocked, the electronic shopping cart is sent to the remote device with a sales attribution value.

In some example embodiments, the mobile POS device has a camera, and the instructions may cause the at least one processor to perform: capturing an image, by the camera, of a machine-readable code associated with the product; and determining the product identifier based on the machine-readable code.

In some example embodiments, the machine-readable code may be a bar code or QR code.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure will be described in the context of an e-commerce platform, discussed below. However, it should be understood that this discussion is only for the purpose of illustration and is not intended to be limiting. Further, it should be understood that the present disclosure may be implemented in other contexts, and is not necessarily limited to implementation in an e-commerce platform.

Throughout this disclosure, unless otherwise stated, the terms "shopping cart" and "cart" have the same meaning as "electronic shopping cart" or "virtual shopping cart". An electronic or virtual shopping cart is a software data object (or simply "object"), which may include a set of data fields and/or other data objects. For example, a shopping cart object may contain one or more product data objects Put another way, a shopping cart object may include a collection of product data objects. Each product data object may contain one or more data fields, including for instance, a first data field representative of a price, a second data field representative of a quantity of the product in the shopping cart, and a third data field representative of a warehouse location of the product. The shopping cart object may further include, when applicable, data fields representing a tax rate, a delivery charge, and so on. In some cases, there may be one or more instances of a given one of such data fields. For example, it may be that such one instance of such a data field is associated with a subset of the product data objects contained in a shopping cart object, while another instance is associated with another (non-overlapping) subset of the product data objects. As a particular example, it may be that different tax rates are associated with different subsets of items (e.g., food vs non-food). In another example, it may be that different shipping rates may apply to different sets of products such as, for example, where some products are shipped separately from others (e.g., due to their origination from different warehouses and/or because of drop-shipping). In any event, some or all of the data fields and objects in a shopping cart object become input to the electronic checkout process in an e-commerce transaction, and are carried through, when appropriate, to post-transaction processes such as order assessment and fulfillment.

Throughout this disclosure, unless otherwise stated, the terms "mobile POS device", "mobile POS terminal", "mobile POS apparatus" and "mobile POS system" refer to the same mobile POS device and system, which include both hardware and software components for facilitating a POS transaction as described herein. Furthermore, although the following explanation is made in reference to a mobile or wireless POS device, this is by way of example. For example, a skilled person having regard to the present disclosure may recognize that the subject matter described herein to be applicable to some non-mobile or wired POS devices and systems.

Figure 1:
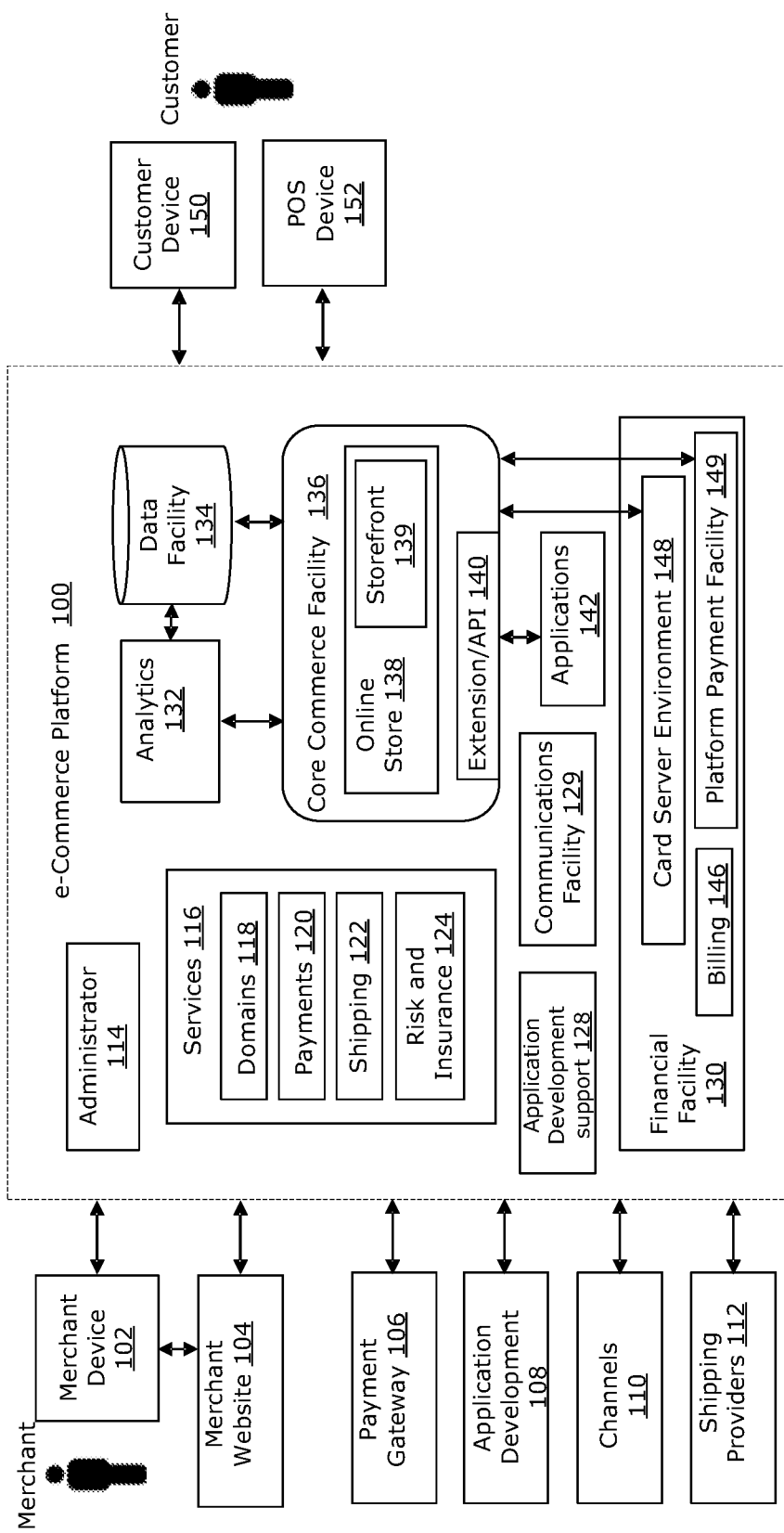
FIG. 1 is a block diagram of an example e-commerce platform, in which examples described herein may be implemented.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products or offerings. All references to products or offerings throughout this disclosure should also be understood to be references to products and/or services, including physical products, digital content, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, it should be understood that aspects of the e-commerce platform 100 may be more generally available to support users in an e-commerce environment, and all references to merchants and customers throughout this disclosure should also be understood to be references to users, such as where a user is a merchant-user (e.g., a seller, retailer, wholesaler, or provider of products) and a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Further, it should be understood that any individual or group of individuals may play more than one role and may fit more than one label in the e-commerce environment. For example, a corporate user may also be a customer.

The e-commerce platform 100 may provide a centralized system for providing merchants with online resources for managing their business. Merchants may utilize the e-commerce platform 100 for managing commerce with customers, such as by implementing an e-commerce experience with customers through an online store 138, through channels 110, through point of sale (POS) devices 152 in physical locations (e.g., a physical storefront or other location such as through a kiosk, terminal, reader, printer, 3D printer, and the like), by managing their business through the e-commerce platform 100, by interacting with customers through a communications facility 129 of the e-commerce platform 100, or any combination thereof. A POS device 152 may include, for example, a mobile POS device, a cashier POS terminal, or a self-checkout POS station.

The online store 138 may represent a multitenant facility comprising a plurality of virtual storefronts 139. In various embodiments, merchants may manage one or more storefronts 139 in the online store 138, such as through a merchant device 102 (e.g., computer, laptop computer, mobile computing device, and the like), and offer products to customers through a number of different channels 110 (e.g., an online store 138; a physical storefront through a POS device 152; electronic marketplace, through an electronic buy button integrated into a website or social media channel such as on a social network, social media page, social media messaging system; and the like). A merchant may sell across channels 110 and then manage their sales through the e-commerce platform 100. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront 139 through the online store 138, and utilizing the communications facility 129 to leverage customer interactions and analytics 132 to improve the probability of sales, for example.

In various embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication, and the like, providing a system for reaching customers and facilitating merchant services for the real or virtual pathways available for reaching and interacting with customers.

In various embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application development 108, channels 110, shipping providers 112, customer devices 150, POS devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a thin client via a web browser, accessed through by POS devices, and the like). In various embodiments, elements of the e-commerce platform 100 may be implemented to operate on various platforms and operating systems, such as iOS, Android, over the internet, and the like.

In various embodiments, storefronts 139 may be served by the e-commerce platform 100 to customers (e.g., via customer devices 150), where customers can browse and purchase the various products available (e.g., add them to a cart, purchase immediately through a buy-button, and the like). Storefronts 139 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their storefront 139. Merchants may customize the look and feel of their website through a theme system, such as where merchants can select and change the look and feel of their storefront 139 by changing their theme while having the same underlying product and business data shown within the storefront's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a basic content management system for website content. Merchants may author blog posts or static pages and publish them to their storefront 139 and/or website 104, such as through blogs, articles, and the like, as well as configure navigation menus. Merchants may upload images (e.g., for products), video, content, data, and the like to the e-commerce platform 100, such as for storage by the system. In various embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110, including the online store 138, over the telephone, as well as through physical POS devices 152 as described herein. The e-commerce platform 100 may provide business support services 116, an administrator component 114, and the like associated with running an online business, such as providing a domain service 118 associated with their online store, payments services 120 for facilitating transactions with a customer, shipping services 122 for providing customer shipping options for purchased products, risk and insurance services 124 associated with product protection and liability, merchant billing services 146, and the like. Services 116 may be provided via the e-commerce platform 100 or in association with external facilities, such as through a payment gateway 106 for payment processing, shipping providers 112 for expediting the shipment of products, and the like.

In various embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
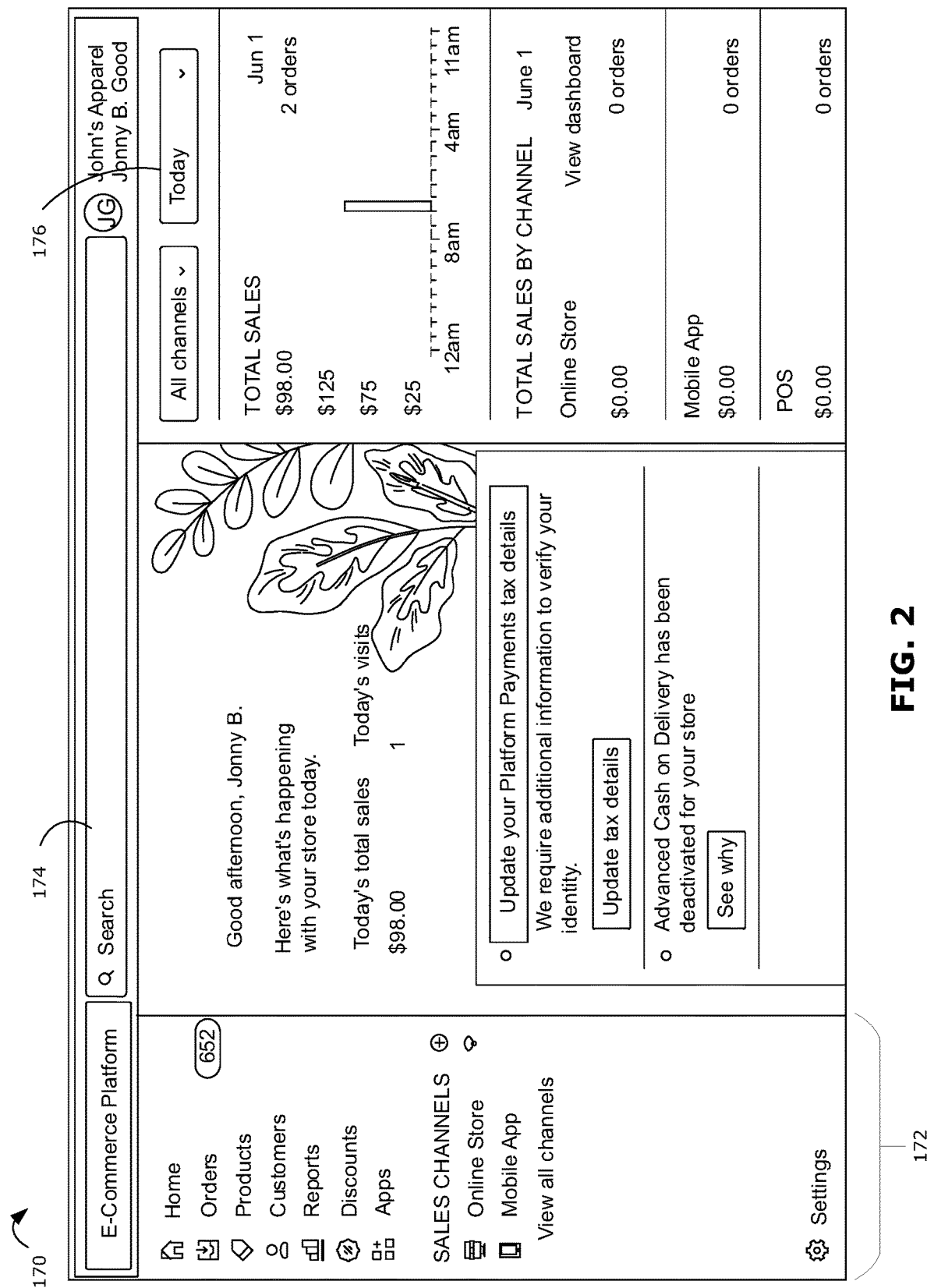
FIG. 2 is an example homepage of an administrator, which may be accessed via the e-commerce platform of FIG. 1.

FIG. 2 depicts a non-limiting embodiment for a home page 170 of an administrator 114, which may show information about daily tasks, a store's recent activity, and the next steps a merchant can take to build their business. In various embodiments, a merchant may log in to administrator 114, such as from a browser or mobile device, and manage aspects of their storefront, such as viewing the storefront's recent activity, updating the storefront's catalog, managing orders, recent visits activity, total orders activity, and the like. In various embodiments, the merchant may be able to access the different sections of administrator 114 by using the sidebar 172, such as shown on FIG. 2. Sections of the administrator may include core aspects of a merchant's business, including orders, products, and customers; sales channels, including the online store, POS, and buy button; applications installed on the merchant's account; settings applied to a merchant's storefront 139 and account. A merchant may use a search bar 174 to find products, pages, or other information. Depending on the device the merchant is using, they may be enabled for different functionality through the administrator 114. For instance, if a merchant logs in to the administrator 114 from a browser, they may be able to manage all aspects of their storefront 139. If the merchant logs in from their mobile device, they may be able to view all or a subset of the aspects of their storefront 139, such as viewing the storefront's recent activity, updating the storefront's catalog, managing orders, and the like.

More detailed information about commerce and visitors to a merchant's storefront 139 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110 from different periods of time (e.g., days, weeks, months, and the like), such as by using drop-down menus 176. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's storefront 139, such as based on account status, growth, recent customer activity, and the like. Notifications may be provided to assist a merchant with navigating through a process, such as capturing a payment, marking an order as fulfilled, archiving an order that is complete, and the like.

Reference is made back to FIG. 1. The e-commerce platform may provide for a communications facility 129 and associated merchant interface for providing electronic communications and marketing, such as utilizing an electronic messaging aggregation facility (not shown) for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 130 for secure financial transactions with customers, such as through a secure card server environment 148. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 130 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In various embodiments, online store 138 may support a great number of independently administered storefronts 139 and process a large volume of transactional data on a daily basis for a variety of products. Transactional data may include customer contact information, billing information, shipping information, information on products purchased, information on services rendered, and any other information associated with business through the e-commerce platform 100. In various embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

In various embodiments, the e-commerce platform 100 may be configured with a core commerce facility 136 for content management and task automation to enable support and services to the plurality of storefronts 139 (e.g., related to products, inventory, customers, orders, collaboration, suppliers, reports, financials, risk and fraud, and the like), but be extensible through applications 142 that enable greater flexibility and custom processes required for accommodating an ever-growing variety of merchant storefronts 139, POS devices 152, products, and services. For instance, the core commerce facility 136 may be configured for flexibility and scalability through portioning (e.g., sharding) of functions and data, such as by customer identifier, order identifier, storefront identifier, and the like. The core commerce facility 136 may accommodate store-specific business logic and a web administrator. The online store 138 may represent a channel, be embedded within the core commerce facility 136, provide a set of support and debug tools that support uses for merchants, and the like. The core commerce facility 136 may provide centralized management of critical data for storefronts 139.

The core commerce facility 136 includes base or "core" functions of the e-commerce platform 100, and as such, as described herein, not all functions supporting storefronts 139 may be appropriate for inclusion. For instance, functions for inclusion into the core commerce facility 136 may need to exceed a core functionality threshold through which it may be determined that the function is core to a commerce experience (e.g., common to a majority of storefront activity, such as across channels, administrator interfaces, merchant locations, industries, product types, and the like), is re-usable across storefronts (e.g., functions that can be re-used/modified across core functions), limited to the context of a single storefront at a time (e.g., implementing a storefront 'isolation principle', where code should not be able to interact with multiple storefronts at a time, ensuring that storefronts cannot access each other's data), provide a transactional workload, and the like. Maintaining control of what functions are implemented may enable the core commerce facility 136 to remain responsive, as many required features are either served directly by the core commerce facility 136 or enabled by its extension/application programming interface (API) 140 connection to applications 142. If care is not given to restricting functionality in the core commerce facility 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the core commerce facility 136 may be configured to maintain responsiveness, such as through configuration that utilizes timeouts, queues, backpressure to prevent degradation, and the like.

Although isolating storefront data is important to maintaining data privacy between storefronts 139 and merchants, there may be reasons for collecting and using cross-store data, such as for example, with an order risk assessment system or a platform payment facility, both of which require information from a majority of storefronts 139 to perform well. In various embodiments, rather than violating the isolation principle, it may be preferred to move these components out of the core commerce facility 136 and into their own infrastructure within the e-commerce platform 100. For example, the data facility 134 and analytics 132 may be located outside the core commerce facility 136.

In various embodiments, the e-commerce platform 100 may provide for a platform payment facility 149, which is another example of a component that utilizes data from the core commerce facility 138 but may be located outside so as to not violate the isolation principle. The platform payment facility 149 may allow customers interacting with storefronts 139 to have their payment information stored safely by the core commerce facility 136 such that they only have to enter it once. When a customer visits a different storefront 139, even if they've never been there before, the platform payment facility 149 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from a storefront's checkout, allowing information to be made available globally across storefronts 139. It would be difficult and error prone for each storefront 139 to be able to connect to any other storefront 139 to directly retrieve the payment information stored there. As a result, the platform payment facility 149 may be implemented external to the core commerce facility 136.

For those functions that are not included within the core commerce facility 138, applications 142 provide a way to add features to the e-commerce platform 100. Applications 142 may be able to access and modify data on a merchant's storefront 139, perform tasks through the administrator 114, create new flows for a merchant through a user interface (e.g., that is surfaced through extensions/API 140), and the like. Merchants may be enabled to discover and install applications 142 through application searching 208 and application recommendations 210 (see FIG. 3). In various embodiments, core products, core extension points, applications, and the administrator 114 may be developed to work together. For instance, application extension points may be built inside the administrator 114 so that core features may be extended by way of applications 142, which may deliver functionality to a merchant through the extension/API 140.

In various embodiments, applications 142 may deliver functionality to a merchant through the extension/API 140, such as where an application 142 is able to surface transaction data to a merchant (e.g., App: "Surface my app in mobile and web admin using the embedded app SDK"), and/or where the core commerce facility 136 is able to ask the application to perform work on demand (core: "App, give me a local tax calculation for this checkout").

Applications 142 may support storefronts 139 and channels 110, provide merchant support, integrate with other services, and the like. Where the core commerce facility 136 may provide the foundation of services to the storefront 139, the applications 142 may provide a way for merchants to satisfy specific and sometimes unique needs. Different merchants will have different needs, and so may benefit from different applications 142. Applications 142 may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142 may be connected to the core commerce facility 136 through an extension/API layer 140, such as utilizing APIs to expose the functionality and data available through and within the core commerce facility 136 to the functionality of applications (e.g., through REST, GraphQL, and the like). For instance, the e-commerce platform 100 may provide API interfaces to merchant and partner-facing products and services, such as including application extensions, process flow services, developer-facing resources, and the like. With customers more frequently using mobile devices for shopping, applications 142 related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the core commerce facility 136, thus providing merchants what they need when they need it. For instance, shipping services 122 may be integrated with the core commerce facility 136 through a shipping or carrier service API, thus enabling the e-commerce platform 100 to provide shipping service functionality without directly impacting code running in the core commerce facility 136.

Many merchant problems may be solved by letting partners improve and extend merchant workflows through application development, such as problems associated with back-office operations (merchant-facing applications) and in the storefront (customer-facing applications). As a part of doing business, many merchants will use mobile and web related applications on a daily basis for back-office tasks (e.g., merchandising, inventory, discounts, fulfillment, and the like) and storefront tasks (e.g., applications related to their online shop, for flash-sales, new product offerings, and the like), where applications 142, through extension/API 140, help make products easy to view and purchase in a fast growing marketplace. In various embodiments, partners, application developers, internal applications facilities, and the like, may be provided with a software development kit (SDK), such as through creating a frame within the administrator 114 that sandboxes an application interface. In various embodiments, the administrator 114 may not have control over nor be aware of what happens within the frame. The SDK may be used in conjunction with a user interface kit to produce interfaces that mimic the look and feel of the e-commerce platform 100, such as acting as an extension of the core commerce facility 136.

Applications 142 that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the core commerce facility 136, such as for synchronizing a local database, notifying an external integration partner, and the like. Update events may enable this functionality without having to poll the core commerce facility 136 all the time to check for updates, such as through an update event subscription. In various embodiments, when a change related to an update event subscription occurs, the core commerce facility 136 may post a request, such as to a predefined callback URL. The body of this request may contain a new state of the object and a description of the action or event. Update event subscriptions may be created manually, in the administrator facility 114, or automatically (e.g., via the API). In various embodiments, update events may be queued and processed asynchronously from a state change that triggered them, which may produce an update event notification that is not distributed in real-time.

Figure 3:
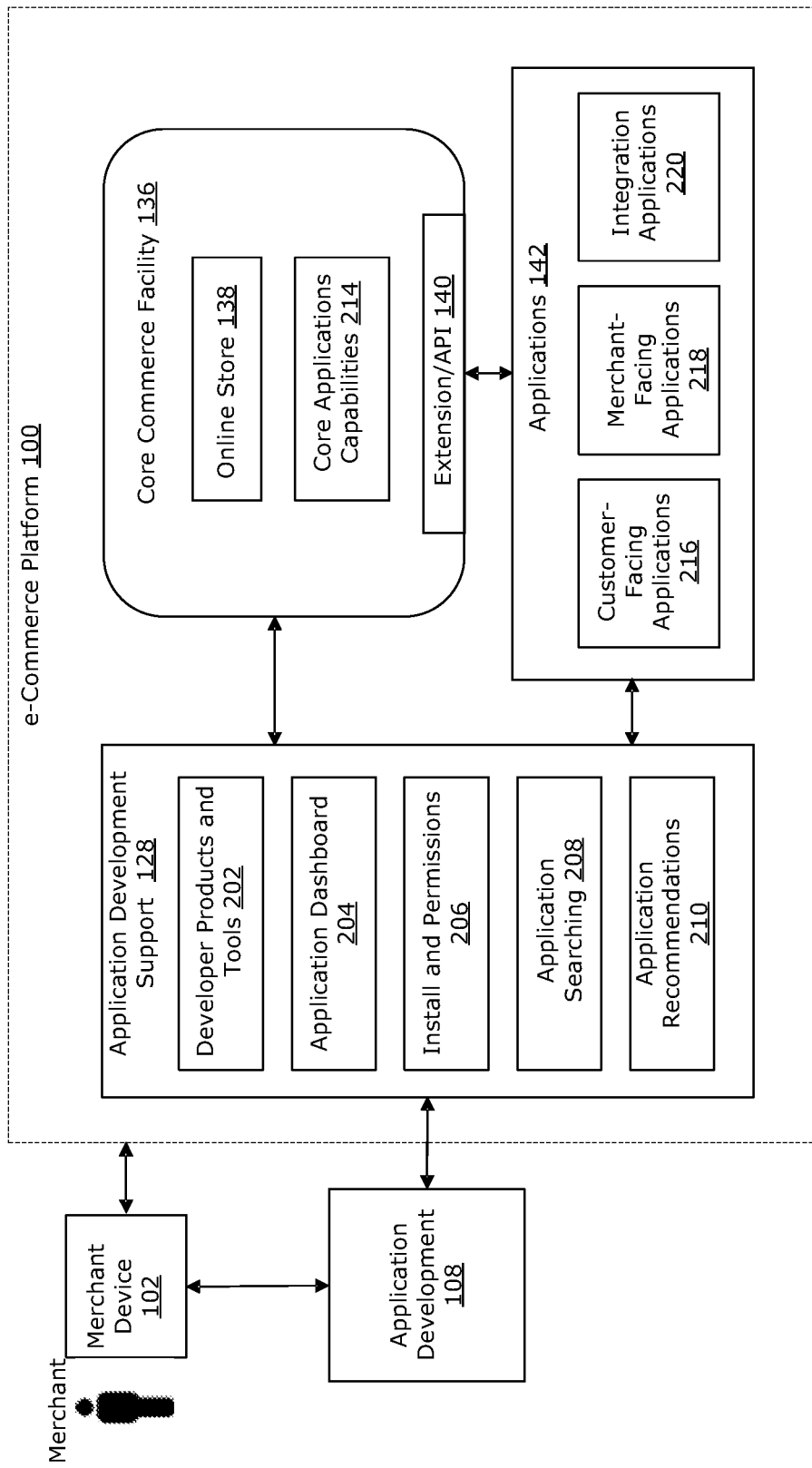
FIG. 3 is another block diagram of the e-commerce platform of FIG. 1, showing some details related to application development.

Reference is made to FIG. 3, which is another depiction of the e-commerce platform 100. FIG. 3 omits some details that have been described with reference to FIG. 1, and shows further details discussed below. In various embodiments, the e-commerce platform 100 may provide application development support 128. Application development support 128 may include developer products and tools 202 to aid in the development of applications, an application dashboard 204 (e.g., to provide developers with a development interface, to administrators for management of applications, to merchants for customization of applications, and the like), facilities for installing and providing permissions 206 with respect to providing access to an application 142 (e.g., for public access, such as where criteria must be met before being installed, or for private use by a merchant), application searching 208 to make it easy for a merchant to search for applications 142 that satisfy a need for their storefront 139, application recommendations 210 to provide merchants with suggestions on how they can improve the user experience through their storefront 139, a description of core application capabilities 214 within the core commerce facility 136, and the like. These support facilities may be utilized by application development 108 performed by any entity, including the merchant developing their own application 142, a third-party developer developing an application 142 (e.g., contracted by a merchant, developed on their own to offer to the public, contracted for use in association with the e-commerce platform 100, and the like), or an application being developed by internal personal resources associated with the e-commerce platform 100. In various embodiments, applications 142 may be assigned an application identifier (ID), such as for linking to an application (e.g., through an API), searching for an application, making application recommendations, and the like.

The core commerce facility 136 may include base functions of the e-commerce platform 100 and expose these functions through APIs to applications 142. The APIs may enable different types of applications built through application development 108. Applications 142 may be capable of satisfying a great variety of needs for merchants but may be grouped roughly into three categories: customer-facing applications 216, merchant-facing applications 218, or integration applications 220. Customer-facing applications 216 may include storefront 139 or channels 110 that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 218 may include applications that allow the merchant to administer their storefront 139 (e.g., through applications related to the web or website or to mobile devices), run their business (e.g., through applications related to POS devices 152), to grow their business (e.g., through applications related to shipping (e.g., drop shipping), use of automated agents, use of process flow development and improvements), and the like. Integration applications 220 may include applications that provide useful integrations that participate in the running of a business, such as shipping providers 112 and payment gateways.

In various embodiments, an application developer may use an application proxy to fetch data from an outside location and display it on the page of an online storefront 139. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142 so that the core commerce facility 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110, adds what they intend to buy to their cart, proceeds to checkout, and pays for the content of their cart resulting in the creation of an order for the merchant. The merchant may then view and fulfill (or cancel) the order. The product is then delivered to the customer. If the customer is not satisfied, they might return the products to the merchant.

In an example embodiment, a customer may browse a merchant's products on a channel 110. A channel 110 is a place where customers can view and buy products. In various embodiments, channels 110 may be modeled as applications 142 (a possible exception being the online store 138, which is integrated within the core commence facility 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In various embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., "secret" strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110 may use the core commerce facility 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through the card server environment 148. In various embodiments, the payment gateway 106 may accept international payment, such as integrating with leading international credit card processors. The card server environment 148 may include a card server application, card sink, hosted fields, and the like. This environment may act as the secure gatekeeper of the sensitive credit card information.

Figure 4:
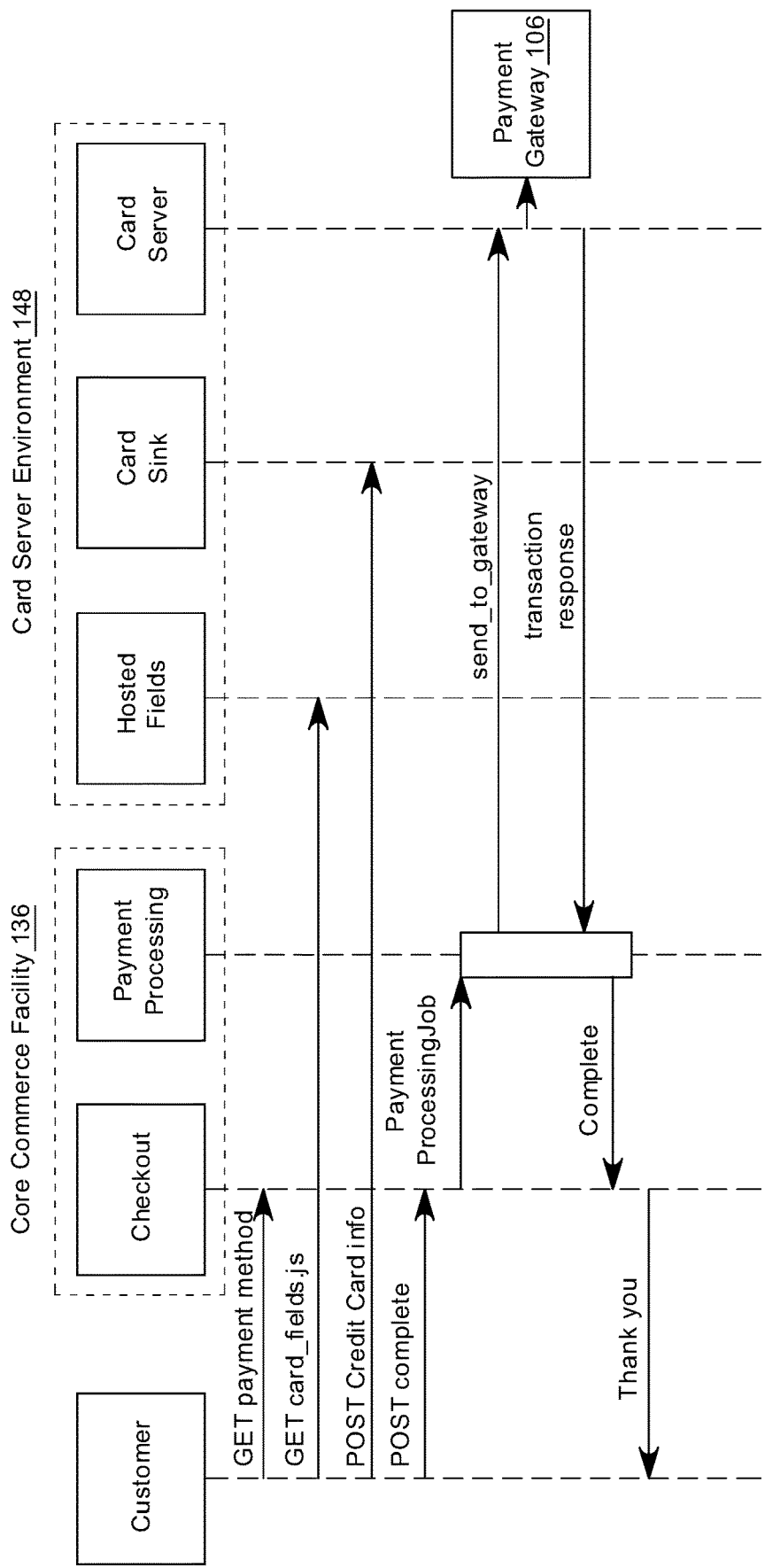
FIG. 4 shows an example data flow that may take place when a purchase is made using the e-commerce platform of FIG. 1.

FIG. 4 presents, in a non-limiting example, a simplified sequence diagram of the interactions between the core commerce facility 136 and the card server environment 148 during payment processing of a credit, prepaid, gift or other card on a Web Checkout.

In various embodiments, most of the process may be orchestrated by a payment processing job. The core commerce facility 136 may support many other payment methods, such as through an offsite payment gateway 106 (e.g., where the customer is redirected to another website), manually (e.g., cash), via a POS device or terminal, online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110 that do not rely on core commerce facility checkouts may use an order API to create orders. Once an order is created, an order confirmation notification may be sent to the customer and an order placed notification sent to the merchant via a notifications component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor). The merchant may then view and fulfill (or cancel) the order.

An order assessment component may implement a business process merchants use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In various embodiments, this business process may be implemented by a fulfillment component. The fulfillment component may group the line items of the order into a logical fulfillment unit of work based on an inventory location and fulfillment service. The merchant may assess the order, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that does not provide an API connection). An API fulfillment service may trigger a third party, where the third-party application creates a fulfillment record. A legacy fulfillment service may trigger a custom API call from the core commerce facility 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a returns component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that were not returned and remain in the customer's hands); and the like. A return may represent a change to the contract of sale (e.g., the order), and where the e-commerce platform 100 may make the merchant aware of compliance issues with respect to legal obligations (e.g., with respect to taxes). In various embodiments, the e-commerce platform 100 may enable merchants to keep track of changes to the contract of sales over time, such as implemented through a sales model component (e.g., an append-only date-based ledger that records sale-related events that happened to an item).

Figure 5:
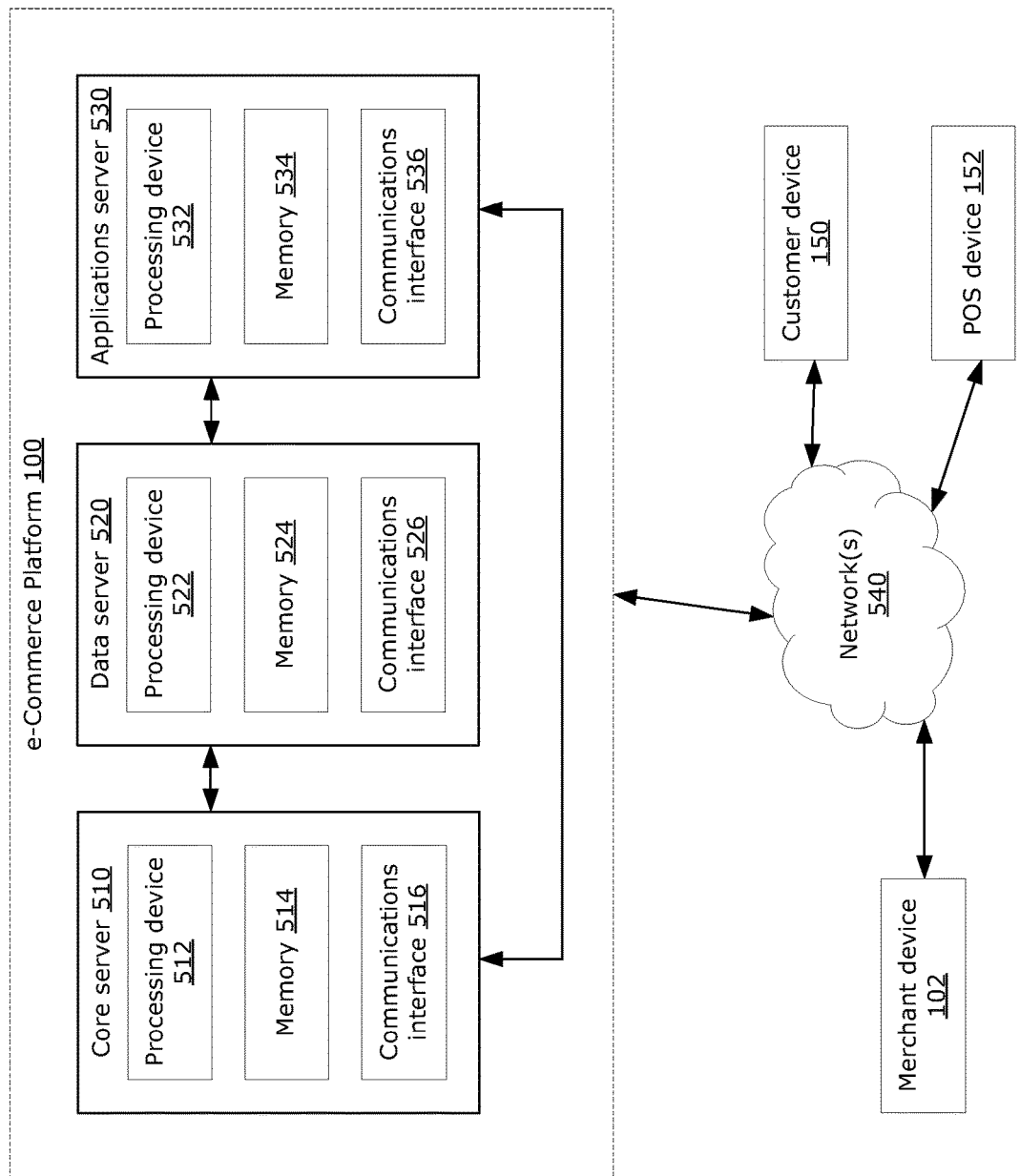
FIG. 5 is a block diagram illustrating an example implementation of the e-commerce platform of FIG. 1.

FIG. 5 is a block diagram of an example hardware configuration of the e-commerce platform 100. It should be noted that different components of the e-commerce platform 100 (e.g., the data facility 134, analytics facility 132, core commerce facility 136 and applications 142) may be implemented in separate hardware or software components, on a common hardware component or server or configured as a common (integrated) service or engine in the e-commerce platform 100. In the example of FIG. 5, the e-commerce platform 100 includes a core server 510, a data server 520 and an applications server 530, which are each in communication with each other (e.g., via wired connections and/or via wireless intranet connections). Each of the servers 510, 520, 530 include a respective processing device 512, 522, 532 (each of which may be, for example, a microprocessor, graphical processing unit, digital signal processor or other computational element), a respective memory 514, 524, 534 (each of which may be, for example, random access memory (RAM), read only memory (ROM), hard disk, optical disc, subscriber identity module (SIM) card, memory stick, secure digital (SD) memory card, and the like, and may include tangible or transient memory), and a respective communications interface 516, 526, 536 (each of which may include transmitter, receiver and/or transceiver for wired and/or wireless communications). The core server 510 may store instructions and perform operations relevant to core capabilities of the e-commerce platform, such as providing the administrator 114, analytics 132, core commerce facility 136, services 116 and/or financial facility 130, among others. The data server 520 may be used to implement the data facility 134, among others. The applications server 530 may store instructions and perform operations relevant to the applications 142, such as storing instructions and data for the applications 142 and for implementing application development support 128.

Merchants and customers, using respective devices 102, 150, 152 may access the e-commerce platform 100 via one or more networks 540 (e.g., wired and/or wireless networks, including a virtual private network (VPN), the Internet, and the like).

Although FIG. 5 illustrates an example hardware implementation of the e-commerce platform 100, it should be understood that other implementations may be possible. For example, there may be greater or fewer numbers of servers, the e-commerce platform 100 may be implemented in a distributed manner, or at least some of the memories 514, 524, 534 may be replaced with external storage or cloud-based storage, among other possible modifications.

Figure 6:
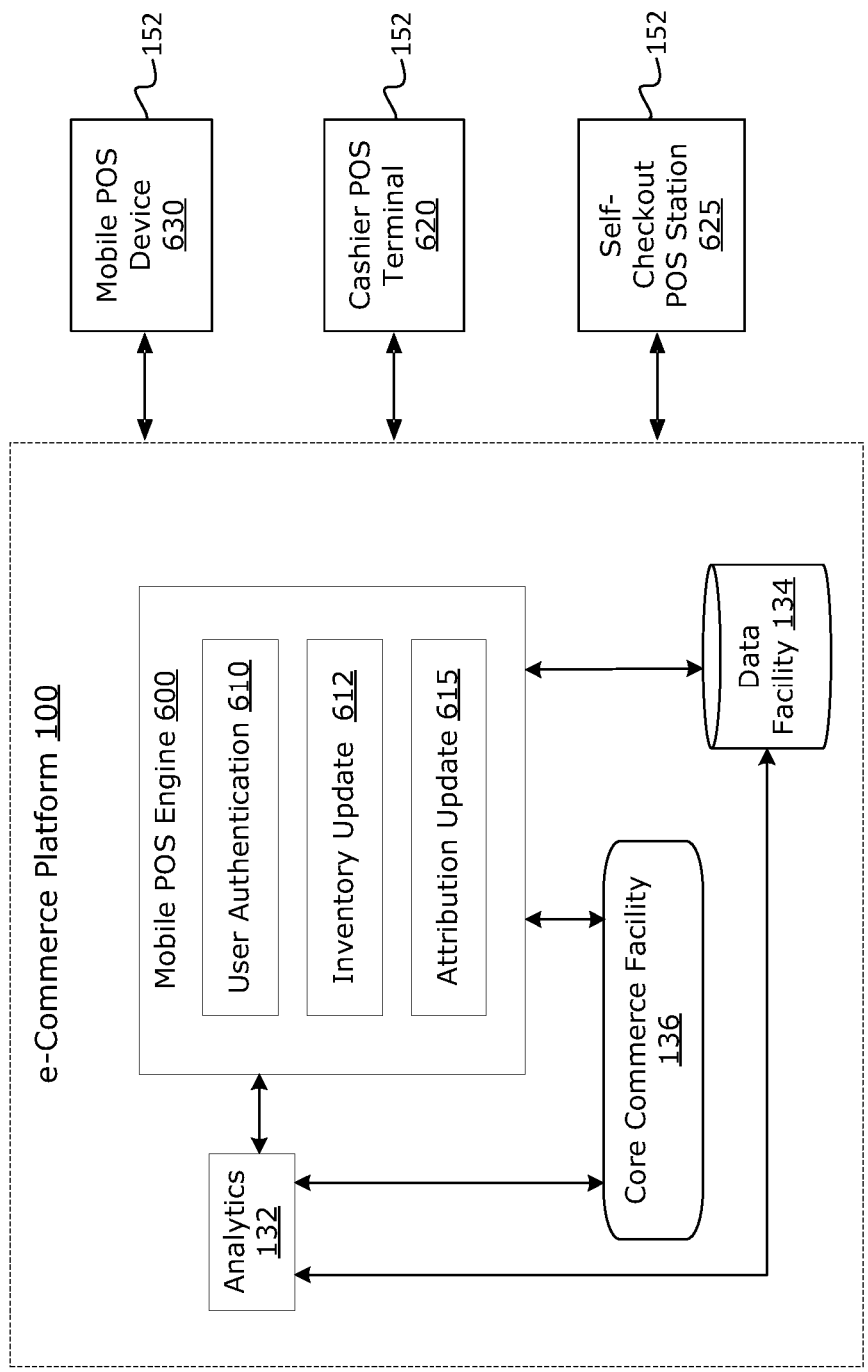
FIG. 6 is another block diagram of the e-commerce platform of FIG. 1, showing some details related to a mobile POS device.

Referring now to FIG. 6, which is a depiction of the e-commerce platform 100 that omits some details that have been described with reference to FIG. 1, and shows further details discussed below. In particular, FIG. 6 illustrates some details of the e-commerce platform 100 that are relevant to a mobile POS device 630 (also referred to as a mobile device 630).

In some example embodiments, the e-commerce platform 100 may be configured to facilitate seamless operations of one or more physical retail stores, in addition to web-based online stores 138. For example, a physical retail store may be part of an e-commerce network maintained by the e-commerce platform 100, and the e-commerce network may can receive and process various job requests sent from one or more POS devices 152 associated with the physical retail store. For another example, such a physical retail store may have a corresponding online store 138 (FIG. 1), with both the physical store and the online store 138 having access to the same product inventory, and the e-commerce platform 100 may be configured to process orders and perform other tasks sent from one or more POS devices 152 located within the physical retail store, as well as web-based orders from the online store 138, while maintaining the integrity and security of an inventory database and financial system shared by the physical retail store and the online store including by keeping both the inventory database and financial system up to date as transactions are processed in relation to the physical retail store and the online store 138.

A physical retail store may have one or more types of POS devices 152. As illustrated, examples of possible POS devices that a given physical retail store may have include a mobile POS device 630, a cashier POS terminal 620 (commonly known as a cash register), and a self-checkout POS station 625. Both cashier POS terminal 620 and self-checkout POS station 625 may be relatively large in size may be set up as semi-permanent fixtures within the store; while they may be connected to an e-commerce platform 100 or a backend POS system, they are not very mobile as compared to the mobile POS device 630.

A retail staff member may use a mobile POS device while walking around in the physical store to help customers. As stated earlier, the retail staff (or simply "staff") often needs to access advanced functions such as checking inventory status for a product, adding or removing an item from a cart, or performing a checkout action for an existing cart when interacting with a customer. In some cases, requiring staff to log into the mobile POS device prior to certain tasks (e.g., prior to adding an item to a cart), can be problematic as the action of performing the login operation may disrupt a communication flow between the staff and a customer, which could lead to a loss of sales revenue, and may decrease the effectiveness of a mobile POS device. The mobile POS device 630 described herein provides an intermediary, "locked" state for a POS device, where the staff can create or edit (or more generally update) an electronic shopping cart for a customer without having to login or authenticate to the e-commerce or POS system, thereby facilitating a seamless process for building a cart for a customer while avoiding the friction of login. The mobile POS device 630 can prompt for or allow a login or authentication process during a pause in the staff-customer communication, whereby the staff member may login/authenticate to the system so as to unlock the mobile device 630 such as, for example, to check out or continue the cart building. For clarity, an "item" in an electronic shopping cart may refer to a single unit of a given product; for example, a cart may have multiple items of the same product (e.g. three apples), each of which may be considered a different item.

The e-commerce platform 100 in this example includes a mobile POS engine 600. The mobile POS engine 600 may be part of the applications 142 or services 116 of the e-commerce platform 100 for example, or may be a standalone component of the e-commerce platform 100. The mobile POS engine 600 may, for example, be implemented by the applications server 530 of FIG. 5. In other implementations, the mobile POS engine 600 may be implemented as a standalone component and/or a service external to (and independent from) the e-commerce platform 100.

In some examples, the e-commerce platform 100 may make certain services/applications, such as, for example, the mobile POS engine 600 discussed below, accessible to users as standalone services/applications. For example, the POS devices 152 may be configured to work with a separate backend POS system of a physical retail store outside of the e-commerce platform 100, and the mobile POS engine 600 described herein may be implemented on a server of the backend POS system without connecting to an overarching e-commerce network.

The mobile POS engine 600 may be configured to communicate with the mobile POS device 630, the cashier POS terminal 620, and/or the self-checkout POS station 625 via a network 540, which may be a wireless connection. In the illustrated example, the mobile POS engine 600 has three modules: a user authentication module 610, an inventory update module 612, and an attribution update module 615, and may, as shown, be connected to the core commerce facility 136, the data facility 134, and the analytics 132.

User authentication module 610 is operable to register and authenticate users prior to providing access to databases and advanced functions of the e-commerce system 100 that are restricted to authorized, authenticated users. In some example embodiments, the user authentication module 610 may receive user authentication information from the mobile POS device 630, and may verify the user authentication information against existing user data (e.g. a user account) from a user database, which may be stored at data facility 134. User authentication information may include, for example, any one of: a username and password combination, a token generated in real time, a pre-defined pattern of numbers and/or letters, a passcode or a passphrase, and a biometric input such as a fingerprint scan, a facial scan, an iris pattern, a retina pattern, a voice recording, or a combination thereof. Once the user authentication information has been verified, the mobile POS engine 600 may send a message/indication to the mobile POS module 635 confirming that the user authentication information is accurate thereby authorizing the authenticated user to log into e-commerce platform 100.

In some embodiments, the user account of a particular staff member may have a defined role, which is associated with certain permission levels for certain functions and certain access rights for one or more databases. Depending on the role, the staff member, once logged into the e-commerce platform 100, may be permitted to access one or more inventory databases, which may be stored in data facility 134 and/or a remote database server, the databases storing inventory information regarding products sold in the physical retail store in which the mobile POS device 630 is located. In addition, the staff member may also be able to read or write to the inventory databases, and/or create an order by performing a checkout action based on an existing shopping cart in the mobile POS device 630. In other words, once a staff member has authenticated or logged into the e-commerce platform 100 (or a backend POS system where an e-commerce platform 100 is not available), the mobile POS device 630 may be set to an "unlocked" or "authenticated" state, and the staff member may then perform a number of transaction tasks while the mobile device 630 is in the unlocked state.

In some embodiments, even if a user of the mobile POS device 630 has not logged into the mobile POS device 630 or the e-commerce platform 100, the mobile POS device 630 may still be able to request and be granted a read-only access to one or more inventory databases in order to obtain some information regarding one or more products. For example, the mobile POS device 630 may be used to scan and add a product to an electronic shopping cart before any user logs into the device 630, and at the minimum, the mobile POS device 630 may access one or more inventory databases to obtain a price, description, and store or warehouse location of the scanned product prior to adding it to the shopping cart.

A transaction task can include a task related to completion of a transaction based on a shopping cart, such as: initiating or completing a check-out process; interacting with a payment processor to complete a transaction; creating or editing an order; entering, retrieving or processing payment information; entering, retrieving or processing customer information including a customer ID, a loyalty membership ID, an address, payment information or a delivery location; assigning or updating an attribution value; sending a cart or a pending order to a different POS for processing, or manually cancelling an order.

An attribution value can include, for example, a sales attribution value for one or more sold products. An attribution value may be based on the user account that is currently logged into a mobile POS device 630 in an unlocked state.

In some embodiments, the mobile POS device 630 may be able to update a sales attribution value for a shopping cart (e.g., responsive to receipt of manual input for the sales attribution value), even if no user is currently authenticated or logged into the device. Put another way, an update to sales attributed may be permitted despite the mobile POS device 630 being in a locked state.

In some embodiments, a transaction task may be or may include a fulfillment-related task, such as, for example: requesting an order assessment component to assess an order prior to fulfilment; requesting a fulfillment component to fulfil an order; requesting an inventory component to assign or update an inventory count or location for one or more products; or transmitting of a request to fulfill an order to another server or device associated with a supplier or fulfillment center.

In some embodiments, the set of tasks that are considered transaction tasks can be pre-defined, and may be modified or updated by the e-commerce platform 100 when appropriate. For example, a task (e.g. updating a sales attribution value) may be defined as a transaction task at one point in time, and redefined to not be a transaction task at a subsequent point in time (and vice versa).

Inventory update module 612 is operable to, upon/responsive to instructions from the mobile POS engine 600, write or update information regarding a product in one or more inventory databases. The product may be identified by a unique product identifier such as a SKU number. A product may have stock in various physical stores and/or various warehouse units, such stock (e.g. location and available number for sale) may be recorded in real time or near real time in an inventory database. When a product is added to a shopping cart via a mobile POS device 630, corresponding inventory may be reserved to avoid over-selling. For example, a temporary hold may be placed on the product in one or more physical stores, or one or more warehouses; the temporary hold may cause an update to the inventory database, as to temporarily reduce the available stock of the product based on the number of products in the shopping cart. The temporary hold may be released, and the reserved inventory returned back via an update of the inventory database, when a maximum hold time has been reached (e.g. 10 minutes or 30 minutes), when the product has been removed from the shopping cart, or when the shopping cart has been deleted. If and when the shopping cart has been checked out and a successful payment is processed by a mobile POS device 630 (or a different POS device 152), responsive thereto, an order is created, the inventory reservation is converted into a long-term inventory commitment allocated to a specific location (e.g. a physical store or a warehouse). The inventory update module 612 may call an inventory component to record where stocks of the product are stocked, and to update the quantities of the product for each location where appropriate.

An attribution update module 615 is operable to assign or update a value for an attribution variable associated with a shopping cart or an order. For example, a value for a sales attribution variable may be associated with a retail staff member (e.g. a store clerk) that has assisted with a purchase or a shopping experience. The value for the sales attribution variable may be initially assigned based on the user account that has been used to log into the mobile POS device 630. This value may be updated by the attribution update module 615 if appropriate. For example, an automatic update via the mobile POS device 630 is permitted if the mobile POS device 630 is in an unlocked state; and a manual update may be permitted if the mobile POS device 630 is in a locked state where automatic update is not available. For another example, both manual and automatic update of an attribution value may be permitted only when the mobile POS device 630 is in an unlocked state.

In some embodiments, the mobile POS engine 600 may include other modules (not illustrated in FIG. 6) for performing transaction tasks when the mobile POS device 630 is in an unlocked state. For example, a payment process module may be operable to process payment for one or more transactions that have been initiated or completed by the mobile POS device 630. For another example, an order assessment module may be operable to perform order assessment for one or more transactions that have been initiated or completed by the mobile POS device 630. For yet another example, an order fulfillment module may be operable to carry through order fulfillment for one or more orders that have been initiated or completed by the mobile POS device 630. One or both of the order assessment module and the order fulfillment module may need to access and update inventory for one or more products in the inventory databases, and may do so via the inventory update module 612, or alternatively, may call the inventory component directly to perform inventory-related tasks.

The mobile POS device 630 may, in some embodiments, generate and send analytics data regarding one or more shopping carts to the mobile POS engine 600, which in turn may send the analytics data to analytics 132. The analytics data may include data from anonymized customer data, pending sales data, and completed sales data. For instance, the analytics data may include information regarding completed purchases and pending purchases in a shopping cart, which may include product identifier of one or more products in the shopping cart, a location of the mobile POS device 630, a time and a date of when a shopping cart is created, a loyalty account information of a customer, and/or other anonymized data of the customer if available. The analytics data may be stored in data facility 134 and sent to core commerce facility 136, which may leverage the analytics data regarding the shopping carts in order to improve future sales, e.g., through generating suitable marketing campaigns.

Figure 7A:
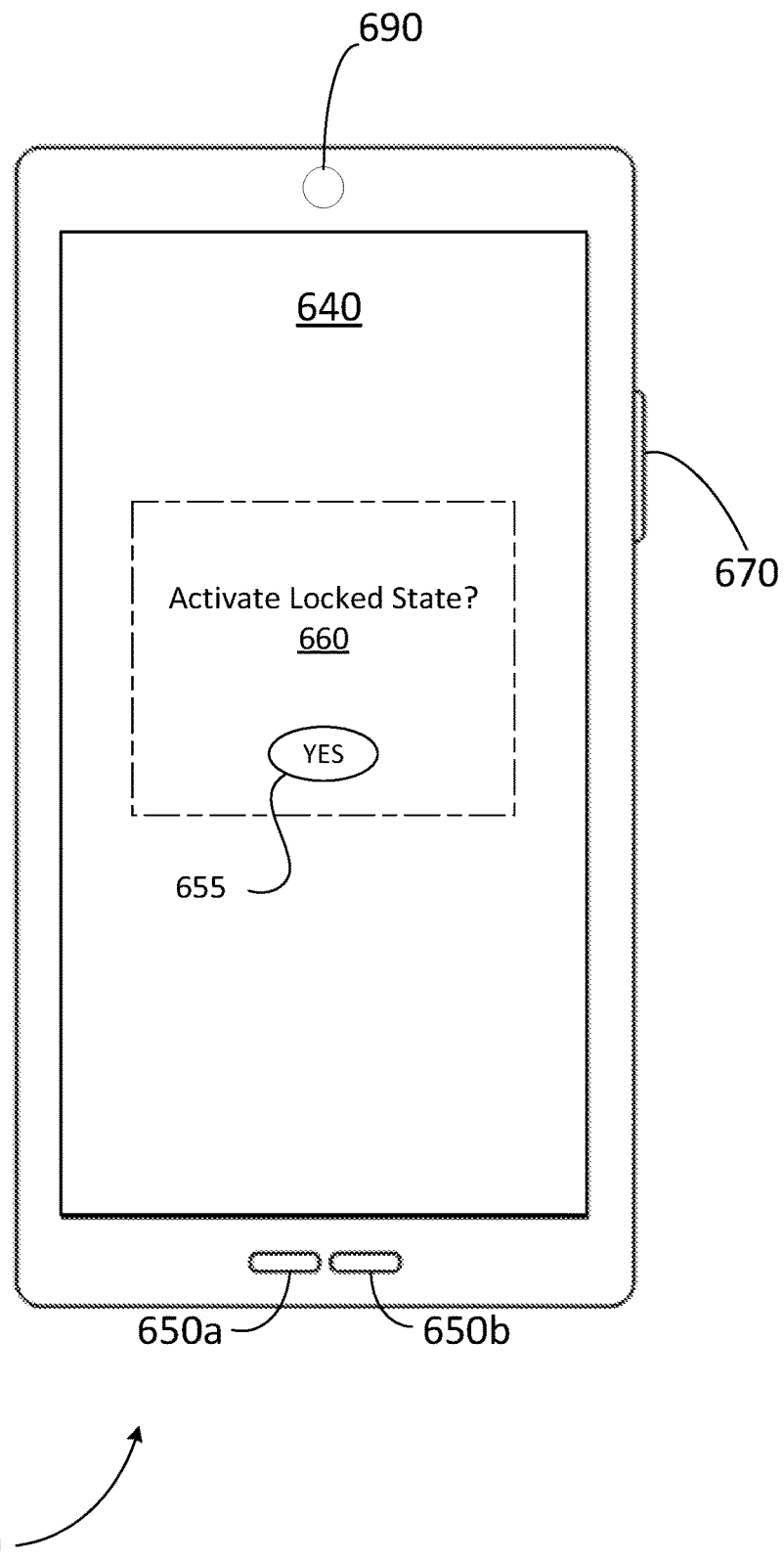
FIG. 7A is a front view of a mobile POS device, in accordance with some example embodiments described herein.
Figure 7B:
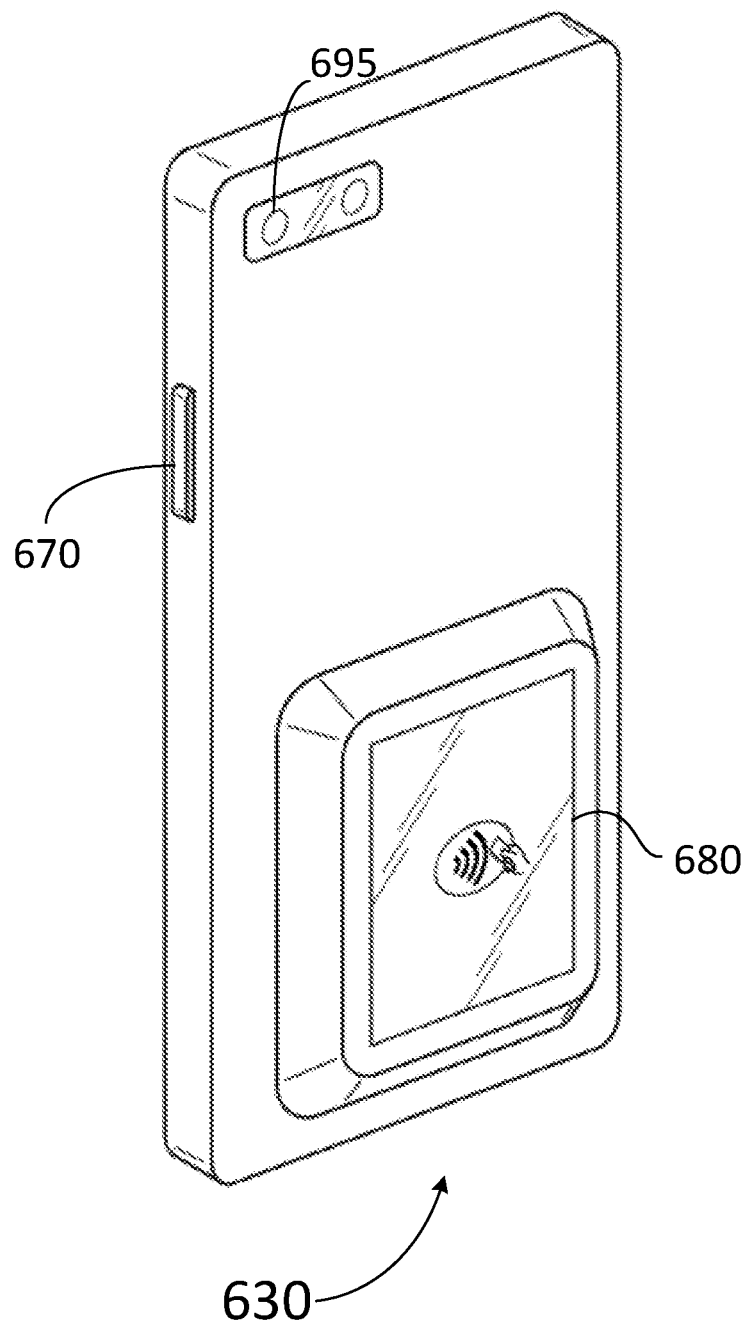
FIG. 7B is a perspective view of a mobile POS device, in accordance with some example embodiments described herein.

FIGS. 7A and 7B show an example mobile POS device 630, in accordance with some example embodiments described herein. In some embodiments, the mobile POS device 630 can be a mobile device configured with a card reader 680. The card reader 680 may be an apparatus removably attached to the mobile POS device 630, or it may be an integral part of the mobile device 630.

In some embodiments, the mobile POS device 630 may be a generic mobile device (e.g. iPad®) with a software application installed thereon. The software application may include appropriate components to receive and/or process payment information. For example, a scanning component may be operable to read a scan of a payment card from a camera unit of the mobile POS device 630 and obtain payment data such as card number, expiration date, and/or card owner. For another example, the software application may have a payment reader component operable to use near-field communication (NFC) technologies in the POS device 630 (and/or an accessory connected thereto) to receive payment information, such as from Apple Pay™ or Google Wallet™.

The mobile POS device 630 has a display screen 640 that is configured to display various user interface (UI) elements 655, 660. The display screen 640 may be touch sensitive. Such a touch-sensitive display may be capable of detecting user input in the form of simple (i.e. single touch) or multi-touch gestures. For example, a user may interact with the touch-sensitive display screen 640 by touching the display with one or more fingers. The user may also use the touch-sensitive display screen 640 to transmit control signals, for example, signals to open or close a shopping cart interface.

The mobile POS device 630 may have one or more soft keys 650a, 650b, 655. A soft key can be a physical button 650a, 650b whose function can be changed programmatically, generally depending on the content currently on the display screen 640. For example, a soft key 650a placed adjacent to a bottom left corner of the display screen 640 may have a function described by the text "select all" shown in the bottom left corner of the display screen 640 at the moment the display screen 640 shows a pending shopping cart having various items within. The same soft key 650a may have a function described by the text "delete all" shown in the bottom left corner of the display screen 640 after a user has selected all the items in the shopping cart. While soft keys 650a, 650b are not necessary components of the mobile POS device 630, they may be pre-programmed to invoke a function that is not directly associated with any text shown on the display screen 640. For example, two short presses on the rightmost soft key 650b may place the mobile POS device 630 in a pre-defined mode or state. The pre-defined state may be a locked state, in which a shopping cart may be created or edited, but may not be checked out. Another sequence of the same soft key 650b (e.g. a long press of over two seconds) may place the mobile POS device 630 into a sleep mode, which means the mobile device 630 is asleep unless it is woken up by some form of user input.

In some embodiments, a soft key 655 can be a UI element shown on a touch-sensitive display screen 640. The soft key 655 may be presented by the mobile POS engine 600 when the user has activated certain software applications, or when the user has requested access to certain functions. For example, when a user of the mobile POS device 630 has attempted to scan an item or add an item to an electronic shopping cart, the mobile POS engine 600 may generate and present an UI element 660 asking the user if he or she wishes to activate a locked state. The user may confirm the intention to activate the locked state by pressing the soft key 655. The touch-sensitive display screen 640 can detect the user input and the mobile POS engine 600 will allow the user to then add a (scanned) item into the electronic shopping cart.

In addition to, or as an alternative of a soft key 655, 650a, 650b, the mobile POS device 630 may have a side button 670 located on a side of the device, for ease of access by a user when the user is using only one hand to hold the mobile device 630. The side button 670 may be pre-programmed to set or change a state or mode of the mobile POS device 630. For example, pressing the side button 670 three times, or holding the side button 670 for two seconds may put the mobile POS device 630 in a locked state or sleep mode.

The mobile POS device 630 may have a keyboard, which may be a QWERTY keyboard, operable to detect and receive user input. A user (e.g. a retail staff member) may use the keyboard to enter a username or password in order to unlock the mobile POS device 630. In some embodiments, when the display screen 640 is touch sensitive, the keyboard may not be a physical keyboard, instead, it may be a touchscreen keyboard that appear when the mobile POS device 630 is held in a certain orientation, when the user has activated certain software applications or functions, or when some UI elements on the display screen 640 need user input (e.g. delivery address for an order).

Referring now to FIG. 7B, the mobile POS device 630 may have a card reader 680 as mentioned above. The card reader 680 is operable to read various types of cards including for example, one or more of a credit card, a loyalty card, a gift card, a driver's license, and/or other types of cards that may have a magnetic stripe having information encoded therein. In some embodiments, instead of, or in addition to a magnetic stripe, the card reader 680 may be operable to read a chip, or any other data storage unit on a card such as, for example, the chip of an EMV payment card. In some embodiments, the card reader 680 may be operable to read data via infrared or Near Field Communication (NFC). For example, the card reader 680 may support contactless payments such as, for example, from Apple Pay.

The mobile POS device 630 may have a camera 690, 695. The camera may be front-facing 690 or rear-facing 695. In some embodiments, the mobile POS device 630 may have both front-facing camera 690 and a rear-facing camera 695. Rear-facing camera 695 may be used to scan and read various machine-readable codes, such as a bar code, a quick response (QR) code, and so on. Additionally or alternatively, the mobile POS device 630 may include another component for reading machine-readable codes/indicia such as, for example, a charge-coupled device (CCD) barcode reader.

Figure 8:
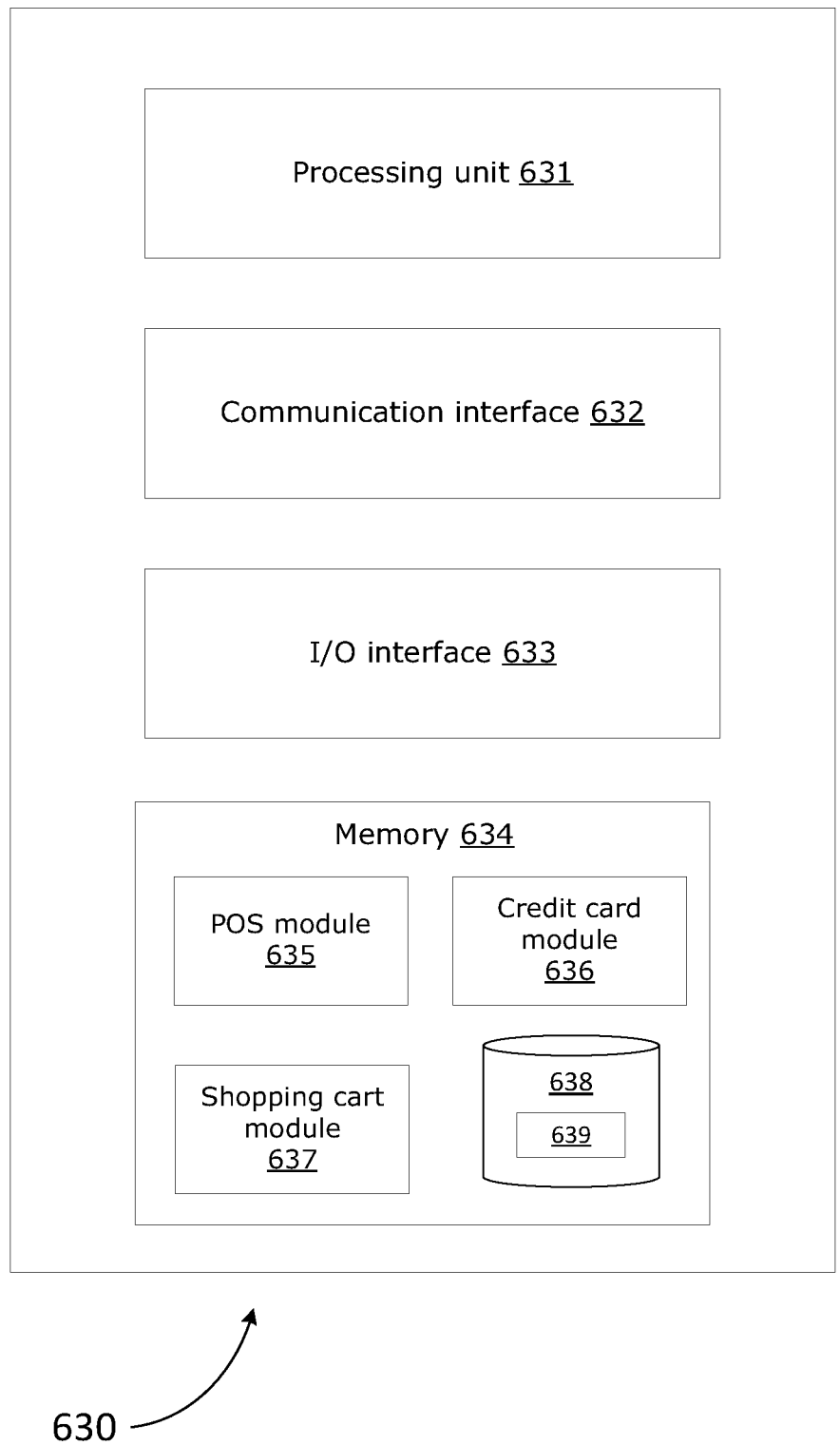
FIG. 8 is a block diagram of a mobile POS device, in accordance with some example embodiments described herein.

FIG. 8 shows a block diagram of an example mobile POS device 630, according to some embodiments. The mobile device 630 may include a processing unit 631, a communication interface 632, an input/output (I/O) interface 633, and one or more memory storage 634. The processing unit 631 can execute instructions from the memory 634 to configure one or more of POS module 635, credit card module 636, shopping cart module 637, and a local database 638. The mobile POS device 630 may be connected via a network 540 to the e-commerce platform 100.

The processing unit 631 implements various processing operations of the mobile POS device 630. For example, the processing unit 631 may perform one or more of signal coding, data processing, power control, input/output processing, or any/or other functionality of the mobile POS device 630. The processing unit 631 may also be configured to implement some or all of the functionality and/or embodiments described in more detail herein. The processing unit 631 may include one or more processing devices. Each processing device can include any suitable processing or computing device configured to perform one or more operations. Each processing unit 631 could, for example, include one or more of a microprocessor, microcontroller, digital signal processor, field programmable gate array, or application specific integrated circuit.

The mobile POS device 630 also includes at least one communication interface 632 for wired and/or wireless communications. Each communication interface 632 includes suitable structure for generating signals for wireless or wired transmission and/or processing signals received wirelessly or by wire, as applicable. For example, a communication interface 632 may include a transceiver unit configured to send and receive wireless signals via network 540.

The mobile POS device 630 further includes one or more input/output (I/O) interfaces 633 (such as an interface to wireless network 540). The input/output interfaces 633 permit interaction with a user or other devices in the network. An I/O interface 633 may also include any suitable structure for providing information to and/or receiving information from a user, such as, for example, one or more of a speaker, microphone, keypad, display 640, soft key 650a, 650b, 655, keyboard, side button 670, card reader 680, camera 690, 695. Notably, in at least some implementations, information provided via and/or received using the I/O interface 633 may include network interface communications.

In addition, the mobile POS device 630 includes at least one memory 634. The memory 634 stores instructions and data used, generated, or collected by the mobile POS device 630. For example, the memory 634 could store software instructions or modules configured to implement some or all of the functionality and/or embodiments described herein and that are executed by the processing unit 631, such as the POS module 635, credit card module 636, and a shopping cart module 637. Each memory 634 includes any suitable volatile and/or non-volatile storage and retrieval device(s). Any suitable type of memory may be used, such as, for example, random access memory (RAM), read only memory (ROM), hard disk, optical disc, subscriber identity module (SIM) card, memory stick, secure digital (SD) memory card, and the like. Notably, in at least some implementations, the memory may be considered a computer-readable medium. In a particular example, suitably computer-readable storage media may be considered non-transitory computer-readable storage media.

In some embodiments, the mobile device 630 can be used as a generic non-POS device. That is, until a user (e.g. a retail staff member) has set the mobile device 630 to function as a POS device, the mobile device 630 has limited functionality. Such limited functionality may include for example making a local phone call, taking a picture with a camera, sending a text message, launching a browser, and/or opening a mobile application that does not require any connection to the e-commerce platform 100 or a backend POS system. That is, without being set as a POS device, the mobile device 630 may not be able to access the e-commerce platform 100 (or a backend POS system), may not be able to access an inventory database, may not be able to build nor edit any shopping cart, and/or may not be able to start any transaction. The mobile device 630 having such limited functionality may serve to prevent or limit unauthorized access to the e-commerce platform 100 and any inventory database via the mobile device 630.

The POS module 635 may be executed to operate the mobile device 630 in a POS (or scanning mode) mode to efficiently and securely create, edit and/or checkout an electronic shopping cart in either a locked state or an unlocked state, as further described below.

When a staff member needs to use the mobile device 630 as a POS device, she can enable a POS mode for the mobile device 630 by pressing one or more hard or soft keys to enter a pre-defined key sequence. For example, at any point in time, she can press a soft key 650a, 650b, 655 twice, or hold the side button 670 for three seconds to set the mobile device 630 to a default state of the POS mode. In some embodiments, instead of a pre-defined key sequence, a fingerprint scan, or another biometric scan may also be used to set the mobile device 630 to the POS mode. The default state of the POS mode for the mobile POS device 630 is a locked state, in which a shopping cart may be started, updated or edited without anyone being logged into the e-commerce platform 100 or a backend POS system. This way, the staff may, when communication with a customer in a retail store, quickly set the mobile POS device 630 to the POS mode to start building a shopping cart for the customer, without having to break a conversation flow with the customer even if the POS device 630 is in a locked state. In this state, an existing shopping cart may also be updated or edited, such as adding or removing an item from the shopping cart. When creating, building, or editing a shopping cart, the POS module 635 calls upon a shopping cart module 637 to create, build or edit a shopping cart object 639 that may be stored on a local database 638 of the mobile POS device 630. In some embodiments, a copy of the shopping cart object 639 may also be stored in data facility 134 of the e-commerce platform 100.

In the locked state, the mobile POS device 630 may be used to scan a bar code or QR code of a product (e.g. using a rear-facing camera unit of the mobile POS device 630) and display a set of information regarding the product, including, for example, price, description of the product, and a SKU number. The POS module 635 may include a code reader submodule to read any machine-readable code and determine a product identifier based on the code. The product identifier might be, for example, a SKU of the product. The code reader submodule may also read a bar or QR code from a customer's loyalty card and determine a membership number. However, in a locked state, the mobile POS device 630 may be precluded from accessing customer information based on the membership number.

Once a shopping cart is ready to be checked out, the mobile POS device 630 needs to be unlocked, i.e., set to an unlocked state, before any task or request relating to initiating or processing a transaction can happen. Such tasks/requests may include, for example: initializing a checkout transaction; processing a checkout process; retrieving or updating an inventory status for one or more products; retrieving customer information; initiating or requesting an order assessment; initiating or requesting an order fulfillment; and/or sending the shopping cart to a remote device for processing. A remote device may, for example, be a cashier POS terminal 620, a self-checkout POS station 625, or a different mobile POS device 630 located within the physical store, or it may be a remote server located at a different store or processing center. A remote device may also need to be in an unlocked state before it may receive and process the shopping cart.

The POS module 635 can determine if the mobile POS device 630 is in a locked or unlocked state, and can set the device to unlocked after detecting that a user has logged in properly. When a staff member needs to check out a shopping cart for a customer, she may enter user authentication information into the mobile POS device 630, which then sends the user authentication information to the mobile POS engine 600 of the e-commerce platform 100. The mobile POS engine 600 may determine, using the user authentication module 610, if the information is accurate based on a user database, which may be stored at data facility 134. User authentication information may, for example, include one of: a username and password combination, a token generated in real time, a pre-defined pattern of numbers and/or letters, a passcode or a passphrase, and a biometric input such as a fingerprint scan, a facial scan, an iris pattern, a retina pattern, and a voice recording, and/or a combination thereof.

After the mobile POS engine 600 of the e-commerce platform 100 has confirmed that the user authentication information is accurate, it may send a confirmation to the mobile POS device 630 indicating that the user may now be logged into the system and/or "unlock" the POS device 630. The mobile POS device 630 may then (e.g., responsive to the confirmation) display a default landing page on the display screen 640 for the logged-in user, which is the staff. In some examples, the default landing page may show the shopping cart in a check-out page, displaying individual item price(s), a total number of items, a total price before and after taxes, and/or the applicable taxes based on a physical location of the store. The staff may edit the shopping cart and the tax, as well as enter additional information such as, at a minimum, payment information. In cases where the purchased goods are to be shipped to the customer, the staff may also enter a delivery information. In some embodiments, the mobile POS device 630 may further scan or read a customer's loyalty card, or receive a customer's phone number or membership number, which can be manually entered by the staff, in order to retrieve information from a customer profile previously stored in a customer database, and use the retrieved information to automatically populate fields such as name, address, payment information, and so on.

Payment may be made with debit card, credit card, loyalty card, or a combination of two or more of the cards. The credit card module 636 is operable to read and process a card from the card reader 680, and facilitate payment from the card to complete a transaction. Card information is encrypted; and in some embodiments, the card information is not stored on any of the mobile POS device 630 once the transaction is complete.

When the mobile POS device 630 is in an unlocked state, the staff may log out of the user account anytime to reset the device 630 back to a locked state. Alternatively, the POS module 635 may automatically log the staff out once a transaction has been completed. A staff member may further set the mobile device 630 to the non-POS mode with limited functionalities by entering a pre-defined key sequence using a key (e.g. a soft key 650a, 650b, 655) and/or a button of the mobile POS device 630, in some examples, the pre-defined key sequence may be simply a hard press of the side button 670, as long as it is different from the key sequence defined for setting the mobile device POS to the locked state.

Figure 9:
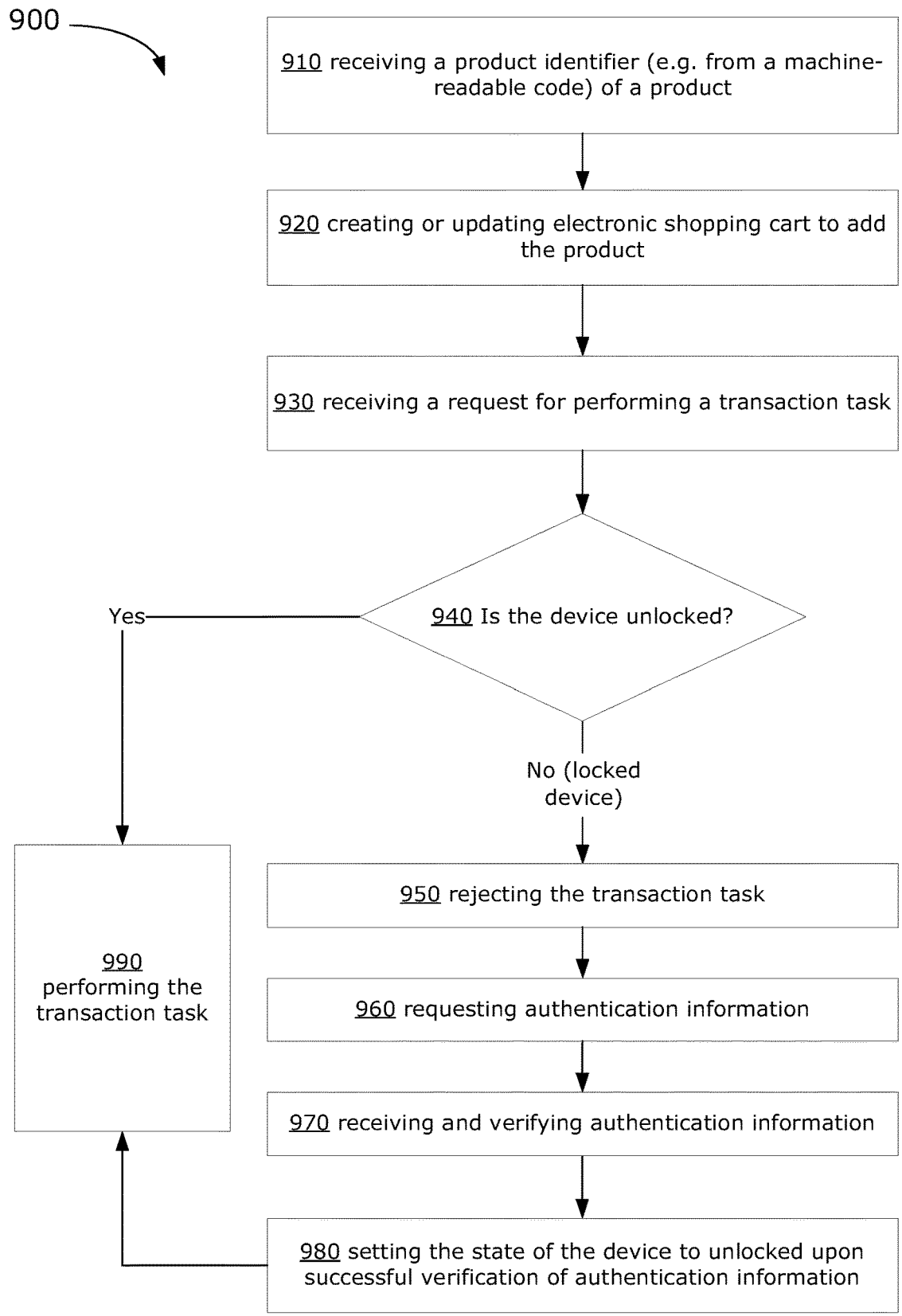
FIG. 9 is a flow chart illustrating a method for facilitating a transaction using a mobile POS device, in accordance with some example embodiments described herein.

FIG. 9 is a flowchart illustrating an example method 900 for facilitating a transaction using a mobile POS device 630. The method 900 may be implemented by a processing unit 631 executing instructions stored in memory 634. A member of the retail staff of a given store may, while talking to a customer in the store, quickly set the mobile POS device 630 to a POS mode by pressing a pre-defined key sequence using a hard or soft key, and start scanning one or more products in the customer's physical shopping cart to create a pending electronic shopping cart, which can be saved in the local database 638 of the mobile device 630. The POS module 635 is then executed by the processor 631 to perform the method 900 as described below.

At step 910, the POS module 635 receives a product identifier of a product. The product identifier may be a SKU code that the POS module 635 determines from a scan of a machine-readable code, such as, for example, a bar code or QR code.

At step 920, the POS module 635 creates and/or updates the electronic shopping cart based on the product identifier of the product. If the POS module 635 does not detect an existing shopping cart further to receiving the product identifier at the step 910 then, at the step 920, the POS module 635, will create a new one via the shopping cart module 637, which can create a new shopping cart object 639 and stores it in the local database 638. At the same time, the POS module 635 can associate the shopping cart object 639 with a device ID of the mobile POS device 630, a store ID of the physical store in which the mobile POS device 630 is located, as well as a physical location (e.g. GPS coordinate information) of the mobile POS device 630. If at this moment in time, the mobile POS device 630 is in an unlocked state, the POS module 635 may also associate the shopping cart object 639 with a unique user ID or a staff ID of a staff member who is currently logged into the mobile POS device 630. Such a unique user ID or staff ID can be used to update a sales attribution value (at step 990) for the shopping cart as further described below.

With the product identifier, the POS module 635 retrieves, from a product database, product information of the product, which includes at least a price and a description of the product, and may optionally include other information such as, for example, warehouse location or store location for the product. The product database may be accessed through mobile POS engine 600 of the e-commerce platform 100. For example, the product database may be stored on data facility 134 or a data storage remotely connected to the e-commerce platform 100, and the POS module 635 of the mobile POS device 630 needs to send a request to the mobile POS engine 600 in order to access the product information. The mobile POS engine 600 may verify that the mobile POS device 630 is in a POS mode prior to retrieving and sending the required product information back to the mobile POS device 630. The POS module 635 may then display the product information of the product on the display screen 640. The POS module 635 may also, additionally or alternatively, add the product to the shopping cart and calculate a total payment amount due for the shopping cart based at least in part on the price of the newly-added product. In at least some implementations, the product information is displayed as part of the shopping cart on a shopping cart page.

At step 930, the POS module 635 receives a request for performing a transaction task. A transaction task is a task that can only be performed when the mobile POS device 630 is in an unlocked state.

A transaction task may be or include a task related to completion of a transaction based on a shopping cart, such as, for example: initiating or completing a check-out process; interacting with a payment processor to complete a transaction; creating an order; entering, retrieving or processing payment information; entering, retrieving or processing customer information including a customer ID, a loyalty membership ID, an address, payment information or a delivery location; assigning or updating an attribution value (e.g. sales attribution value); sending a cart or a pending order to a different POS for processing, or manually cancelling an order.

In some embodiments, a transaction task may be or include fulfillment-related tasks including, for example: requesting an order assessment component to assess an order prior to fulfilment; requesting a fulfillment component to fulfil an order; requesting an inventory component to assign or update an inventory count or location for one or more products; or transmission of a request to fulfill an order to another server or device associated with a supplier or fulfillment center.

In some embodiments, the set of tasks that are considered transaction tasks may be pre-defined, modified or updated by the e-commerce platform 100 when appropriate. That is, a task (e.g. updating a sales attribution value) may be (or included as part of) a transaction task at one point in time, and redefined to be not a transaction task at a subsequent point in time (and vice versa).

At step 940, the POS module 635 determines if the state of the mobile POS device 630 is unlocked. If it is unlocked, the POS module 635 proceeds to perform the transaction task at step 990. Alternatively, if the state of the mobile pos device 630 is locked, the transaction task is rejected as step 950 as further described below.

Example manners of performing a transaction task at the step 990 will now be discussed.

As mentioned above, a transaction task may be or include initiating or processing a check out transaction based on an existing shopping cart stored on a mobile POS device 630. In order to process a check out transaction, inventory information of each item and each product in the shopping cart need to be held and subsequently updated in an inventory database, payment information needs to be processed, and customer information may need to be entered and processed. Prior to entering any customer or payment information, a final check out page may be displayed on the mobile POS device 630. A final check out page may present a clear list of items being purchased and a total price for review by the customer. As a part of the processing of the checkout transaction, the mobile POS 630 may allow a customer to provide payment information via any applicable method, such as, for example, by swiping or inserting a payment card via card reader 680, and/or by entering a phone number, membership ID or any other identifying information, which may be used by the POS module 635 to retrieve payment information from a customer database.

The payment information is encrypted and when appropriate, stored in the encrypted form. If and when the payment information is stored on the mobile POS device 630 or sent to the e-commerce platform 100 for storage (e.g. when a default payment card is entered and stored with user consent), it is stored in compliance with Payment Card Industry Data Security Standards (PCI-DSS). In some embodiments, additional customer information may also be stored and a copy of the customer information may be anonymized and analyzed, with user consent. In some embodiments, the POS module 635 may connect with a payment processor directly as a part of completing a transaction. Alternatively, the POS module 635 may complete the transaction via the e-commerce platform 100, which can connect with a payment processor to process the payment. However completed, once a transaction is complete and payment has been made, the mobile POS device 630, as well as the e-commerce platform 100, may delete part or all of the customer and payment information such as, for example, in order to preserve and/or protect customer privacy/the security of the payment information.

In some embodiments, the information of the shopping cart may be stored (e.g. in a local database 638) by the POS module 635 for use in performing analytics. In at least some such embodiments, when the mobile POS device 630 is in a locked state, a limited amount of information may be stored, which could, for example, include a price, type, or description of each product in the shopping cart, a physical location or device ID of the mobile POS device 630, a store ID of the physical store, and/or a date of time of when the shopping cart is created. When the mobile POS device 630 is in an unlocked state, additional information such as anonymized customer information (if available), a staff or user ID currently associated with the mobile POS device 630, and/or a sales attribution value may be stored. In at least some implementations, such limited and/or additional information may be sent to the mobile POS engine 600, even if the shopping cart itself or a product in the shopping cart has been removed prior to completion of a check out transaction for any reason (e.g., customer decides not to complete a purchase).

Another transaction task may be or include retrieving or updating an inventory status for one or more products. A product may be stocked in various physical stores and/or various warehouse units, and stock levels for such stock (e.g. location and available number for sale) may be recorded/maintained in real time or near real time in an inventory database. In some embodiments, when a product is added to a shopping cart via a mobile POS device 630 when the device is in a locked state, corresponding inventory may be reserved by the POS module 635 and in turn, the mobile POS engine 600 to avoid over-selling. The mobile POS engine 600 may call an inventory update module 612 to perform the necessary action in order to reserve, hold, or update any inventory for one or more products. For example, a temporary hold may be placed on the product in one or more physical stores, or one or more warehouses. Such a the temporary hold may cause an update to the inventory database, so as to temporarily reduce the available stock of the product based on the number of products in the shopping cart. The temporary hold may be released, and the reserved inventory returned back via an update of the inventory database, when a maximum hold time has been reached (e.g. 10 minutes or 30 minutes), when the product has been removed from the shopping cart, or when the shopping cart has been deleted. If and when the shopping cart has been checked out and a successful payment is processed by a mobile POS device, the inventory reservation may be converted into a long-term inventory commitment allocated to a specific location (e.g. a physical store or a warehouse). The inventory update module 612 may call an inventory component to record where stocks of the product are stocked, and to update the quantities of the product for each location where appropriate.

Deleting the shopping cart from the storage 638 of a mobile POS device 630 (or removing the shopping cart from a checkout queue) based on a user command may also be a transaction task or a component thereof. For example, a shopping cart may be removed from a shopping queue or deleted from the mobile POS device 630 when a user of the mobile POS device 630 has entered a user command to remove the shopping cart. Such a user command may be a pre-defined key sequence using a hard or soft key of the mobile POS device 630. Similarly, removing a product from the shopping cart (but keeping the shopping cart itself with one or more other remaining products) may be or may be a part of a transaction task.

At the same time, when the shopping cart has been pending for a defined/pre-determined time duration (e.g. 30 minutes) under a locked state of the mobile POS device and is not being edited nor checked out, the shopping cart may be deemed to be dormant and consequently deleted. Notably, deleting an idle shopping cart in this way is not a transaction task, and the deleting of the shopping cart from the mobile POS device 630 can occur while the mobile POS device 630 is in a locked state. For example, when the mobile POS device 630 in a locked state has detected that the shopping cart has been pending for a defined duration, the POS module 635 may delete the shopping cart.

In some embodiments, the staff using the mobile POS device 630 may wish to send the existing shopping cart to a remote POS device or terminal 152 for processing. This scenario may happen when there are many customers lining up to check out in a store, and one or more retail staff members are helping to scan products from each customer's physical shopping cart prior to sending the scanned information to the appropriate cashier terminal 620 or self-checkout station 625 for payment. In these cases, the remote POS device or terminal 152 (e.g. another mobile device 630, a cashier terminal 620 or self-checkout station 625), may need to be in an unlocked state prior to receiving information relating to an existing shopping cart from the mobile POS device 630. The request to send the existing shopping cart information to the remote POS device or terminal 152 (the "intended recipient") may be handled by the mobile POS engine 600 of the e-commerce platform 100, which may determine the state of the remote POS device or terminal 152 or in real time, and may then either grants or rejects the request for sending the existing shopping cart information based on the respective status of the intended recipient. When a request to send the existing shopping cart information to the intended recipient fails due to the respective state of the intended recipient, the mobile POS engine 600 may send a message to the intended recipient requesting user authentication information.

After the mobile POS engine 600 receives and verifies the user authentication information, it may grant the request to send the existing shopping cart information. The existing shopping cart information may include all or some of the information necessary and appropriate to perform a check out transaction, including, for example, a device ID or location of the mobile POS device 630 sending the shopping cart information, a price, description, warehouse or store location of each item in the shopping cart, a customer profile if available, payment information if available, a staff ID, and/or sales attribution information. This feature allows a shopping cart to be processed anywhere, as long as the particular device or server processing the shopping cart has the requisite authentication status (i.e., unlocked state).

In some embodiments, when the mobile POS device 630 is in an unlocked state, the POS module 635 may be operable to automatically associate a shopping cart on the mobile POS device 630 with a customer ID or account of a customer in close proximity. For example, a Bluetooth signal (e.g., a beacon signal) may be broadcasted from the mobile POS device 630 with a unique identifier, and the unique identifier may be picked up (received) by a mobile device (e.g., a smartphone) carried by a customer and that mobile device may use the unique identifier to connect to the mobile POS device 630. The mobile POS device 630 may then associate the shopping cart with the customer's mobile device. In addition, if the customer already has a customer profile stored on e-commerce platform 100 (e.g. a loyalty club member profile associated with a particular merchant store), the POS module 635 may use an identifier associated with the mobile device (e.g., a phone number of the mobile device where it is a phone) to automatically link the shopping cart with the customer profile. For another example, the mobile POS device 630, with appropriate user consent, may receive from the customer, a voice scan, a fingerprint, a facial scan, and/or any other biometric information of the customer, may identify the customer based on the received biometric information (e.g., by performing a lookup in a database), may obtain/access/identify a corresponding customer profile for the customer (e.g., from the database), and may link that customer profile to the shopping cart. In this way, when the customer is ready to check out based on the shopping cart, one or more fields (e.g., billing and/or shipping information) may be pre-populated based on the customer profile retrieved by the POS module 635 from the e-commerce platform 100.

In some embodiments, the POS module 635 can be implemented on a self-scanning device, or a customer's mobile device (as part of a mobile application) that the customer may use to build an electronic shopping cart without help from a retail staff member. When a customer uses a self-scanning device or his own mobile device, he needs to first authenticate as a legitimate user (e.g. a valid user profile exists upon verification by the POS module 635) prior to sending the electronic shopping cart to a checkout queue or to performing any transaction on the device itself. A self-scanning device or the customer's mobile device may be determined to be in an unlocked state when the customer has authenticated himself with the proper user credentials that are verified by the POS engine 600 on the e-commerce platform 100. When the customer is properly authenticated and the customer's device (or the self-scanning device) is in an unlocked state, the electronic shopping cart can be checked out (or deleted) on the customer's device (or the self-scanning device), or sent to another device, such as a mobile POS device 630 handled by a retail staff member, for performing any transaction task.

After step 940, if and when the mobile POS device 630 is in a locked state (which may, for example, be the case if a staff member has not yet had a chance to log into the mobile device 630), then the POS module 635 rejects the request for performing the transaction task at step 950. The rejection may be communicated, by suitable output from the mobile POS device 630. As a part or separate from the output indicating the rejection of the request, authentication information to allow the mobile POS device 630 to be unlocked may be sought. In particular, the mobile POS device 630 may, at the step 960, display a message on the display screen 640 requesting authentication information from the user.

At step 970, the POS module 635 receives authentication information. The authentication information may be received responsive to a message displayed at the operation 960. The authentication information may be received from the staff member. The authentication information may include, for example, any one of: a username and password combination, a token generated in real time, a pre-defined pattern of numbers and/or letters, a passcode or a passphrase, and a biometric input such as a fingerprint scan, a facial scan, an iris pattern, a retina pattern, a voice recording, or a combination of the foregoing.

Following the receipt of authentication information at the step 970, the POS module 635 sends the received authentication information to the mobile POS engine 600 of the e-commerce platform 100 for verification. The user authentication module 610 of the mobile POS engine 600 may verify the authentication information against a user database. Once the authentication information is successfully verified, the mobile POS engine 600 sends a confirmation of verification back to the POS module 635, which may at step 980 update the state of the mobile POS device to unlocked. The POS module 635 can then perform the transaction task per the request sent earlier.

In some embodiments, instead of sending the received authentication information to the e-commerce platform 100 for verification, the POS module 635 may verify the information against a local database 638, such as, for example, when such a local database 638 contains a user database. For example, a mobile POS device 630 initially registered as belonging to a physical store ABC may store user information, including authentication information, of all employees of the physical store ABC. This way, the need to check with a backend system such as the e-commerce platform 100 to validate authentication information (e.g., to allow a staff member log into the mobile POS device 630 to perform a transaction task may be avoided or limited.

In some embodiments, one or more mobile POS devices 630 may be deployed in a physical store that has no cashiers or staff. A virtual geo-fence may be implemented based on the physical location and boundaries of the store (e.g., when the virtual geo-fence encompasses some or all of the store such as, for example, the customer areas of the store). Such a geo-fence may be used to trigger an action or response when a consumer or any product enters or exits the store. For example, a customer may enter the store with a mobile phone (or any other mobile device), which may be pre-registered/previously associated with a customer profile for that customer and may include information about that customer such as, for example, name, address, and/or payment information. Once inside the store, the location of the mobile phone can be tracked, using GPS, Bluetooth and/or RFID technology, based on a real-time location of the mobile phone. The location of the mobile phone may be deemed to be a location of the customer indicated in the customer profile associated with the mobile phone.

In some embodiments, a processor of e-commerce platform 100, which may be, for example, a processor of a POS device 152 within the physical store, may receive or detect an electronic signal (e.g. a Bluetooth beacon signal with a signal strength over a threshold) indicating a presence of the mobile phone associated with the customer, and determine that the presence of the mobile phone is new compared to the most recent scan of the premises. The electronic signal indicating the presence of the mobile phone may be a wireless signal generated from the mobile phone based on GPS, Bluetooth and/or RFID technology. Similarly, a processor of e-commerce platform 100 can determine that a customer has left the store when it can no longer detect a presence of the mobile phone associated with the customer, (e.g. when the electronic signal can no longer be received or detected) based on a scan of the premises.

In order for a processor of the e-commerce platform 100 to detect a presence of the mobile phone as the mobile phone enters, exits, or stays within the virtual geo-fence, the mobile phone associated with the customer may have a mobile application installed thereon, and the mobile application may have user permission settings indicating that a user of the mobile phone (e.g. the customer) has given explicit permission for the e-commerce platform 100 to track the real-time location of the mobile phone whenever the mobile phone is on the premises of a physical retail store associated with the e-commerce platform 100. The mobile application may periodically (e.g. every 5 seconds) push a real time location of the mobile phone to the processor of the e-commerce platform 100 when the mobile phone is on the premises of a physical retail store associated with the e-commerce platform 100.

When the customer uses a mobile POS device 630 (or the customer's own mobile phone with the appropriate mobile application installed acting as a mobile POS device) to scan one or more products to build an electronic shopping cart, the shopping cart is automatically associated with the customer profile linked to the mobile phone in close proximity.

If a customer is using his own mobile phone, or another mobile device such as a tablet, appropriate mobile application(s) may be installed to assist the mobile phone or tablet functioning as a mobile POS device 630. For example, the mobile application (which may include, employ or otherwise be in communication with the mobile POS engine 600 of the e-commerce platform 100) may include a product scanning component configured to read machine-readable code (e.g. QR code) of a product using a camera unit on the phone, and translate that into product information. The mobile application may have a shopping cart component operable to build and edit an electronic shopping cart from scanning one or more products in the store, when the mobile device 630 is in a locked state. The mobile application may, additionally or alternatively, have a card scanning component operable to read a scan of a payment card from a camera unit of the mobile POS device 630 and obtain payment data such as, for example, card number, expiration date, and/or card owner. The mobile application may, additionally or alternatively, have a payment interface, which is operable, when the mobile device 630 is in an unlocked state, to receive payment information from existing financial applications installed on the mobile phone, such as from Apple Pay™ or Google Wallet™. The mobile application may, additionally or alternatively, have a user interface to receive authentication information from the customer, so that he may create and/or log into a customer account with the e-commerce platform 100 to store or retrieve customer information such as name, address and default payment information.

Once a customer is done scanning the products and ready to check out, he or she can press a button (e.g. a soft key) on the mobile POS device 630 and an automatic checkout process may be completed based on the payment information in the customer profile. Alternatively, the customer may simply walk out of the store, and as the mobile phone he or she carries exits the store, the mobile phone also exits the virtual geo-fence set around the physical store. Shortly before or just when the mobile phone exits the virtual geo-fence, the mobile application installed on the mobile phone may transmit a wireless signal to the processor of the e-commerce platform 100 indicating a real time location of the mobile phone. If and when the real time location is determined to be within a predefined threshold (e.g. 0.3 m) of the perimeter of the virtual geo-fence and outside of the store (for example based on a signal strength of the wireless signal being below a threshold or based on location coordinates transmitted in the signal), the processor of the e-commerce platform 100 may determine that the mobile phone as well as the customer have exited the store. In some embodiments, the processor of the e-commerce platform 100 may determine that the mobile phone as well as the customer have exited the store when it has failed to detect a presence of the mobile phone in a predefined period, such as 5 minutes.

Once the e-commerce platform 100 has determined that the mobile phone and the customer have exited the store, the POS module 635 of the mobile POS device 630, or alternatively, the mobile POS engine 600 of the e-commerce platform 100, may automatically initiate and complete a checkout process based on the customer profile. If a customer does not wish to purchase anything, he may indicate so by deleting any shopping cart he's created using the mobile POS device 630 and confirming that he is not purchasing nor taking any products from the store. In this case, the POS module 635 will not initiate a checkout transaction responsive to detecting that the customer has left the store as there is no pending shopping cart associated with the customer profile.

The embodiments described herein present a mobile POS device 630 operable to build or update an electronic shopping cart by a retail staff member when communicating with a customer, without having to interrupt the conversation flow with the customer, which can be important to generate or improve sales on a retail floor. A quick press on a hard or soft key can activate an intermediary, locked state of the mobile POS device 630 to immediately start the shopping cart without user login. This is an improvement compared to conventional approaches, which require the user to log into a POS device prior to building a shopping cart, likely a source of frustration for both staff and customer and could lead to potential loss of sales.

The described mobile POS device and methods let retail staff choose a natural pause when communicating with the customer to log into the mobile POS device in order to perform more secured tasks such as initiating a transaction based on an existing shopping cart. In addition, some embodiments allow a pending shopping cart to be processed anywhere, as long as the particular device or server processing the shopping cart is properly authenticated (e.g. in unlocked state). In this way, valuable time-saving benefits to customers and retail staff in a crowded store may be provided by allowing multiple staff members to help with scanning items in physical shopping carts, with corresponding electronic shopping carts then being sent to different POS device(s) or station(s) for processing (e.g., to receive payment).

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

All referenced documents are hereby incorporated by reference in their entireties.

The invention claimed is:

1. A processor-implemented method for processing transactions at mobile point-of-sale (POS) devices, the method comprising:
   while a state of a mobile POS device is a locked state:
      updating an electronic shopping cart based on a received product identifier of a product,
      wherein, while the mobile POS is in the locked state, the electronic shopping cart is not associated with any user account;
   receiving a request for performing a transaction task related to the electronic shopping cart;
   responsive to the request for performing the transaction task, determining that the state of the mobile POS device has changed from the locked state to an unlocked state; and
   responsive to determining that the state of the mobile POS device has changed from the locked state to the unlocked state, performing the transaction task, wherein the transaction task is associated with a user account while the mobile POS is in the unlocked state.

2. The method of claim 1, wherein updating the electronic shopping cart based on the product identifier of the product, while the state of the mobile POS device is the locked state, comprises:
   retrieving, from a product database, product information of the product based on the product identifier, the product information including at least a price and a description of the product;
   displaying the product information of the product on a display of the mobile POS device as part of the electronic shopping cart;
   adding the product to the electronic shopping cart; and
   calculating and displaying a total payment amount due for the electronic shopping cart based on the price of the product.

3. The method of claim 1, further comprising:
   in response to the request for performing the transaction task and responsive to determining that the state of the mobile POS device is the locked state, displaying a message on the mobile POS device requesting authentication information from a user;
   responsive to receiving and verifying the authentication information, changing the state of the mobile POS device to the unlocked state; and
   responsive to the state of the mobile POS device being changed from the locked state to the unlocked state, associating the electronic shopping cart with the user account and performing the transaction task associated with the user account.

4. The method of claim 1, further comprising, prior to receiving the product identifier of the product:
   receiving an electronic signal to set the mobile POS device to a POS mode; and
   responsive to the electronic signal, setting a mode of the mobile POS device to the POS mode, wherein the mobile POS device in the POS mode is enabled to receive product identifiers, and wherein a default state of the mobile POS device in the POS mode is the locked state.

5. The method of claim 4, wherein the electronic signal is generated responsive to a press of a key or button of the mobile POS device.

6. The method of claim 1, further comprising:
   detecting that the electronic shopping cart has been pending for a defined duration during which the mobile POS device remained in the locked state; and
   responsive to detecting that the electronic shopping cart has been pending for the defined duration during which the mobile POS device remained in the locked state, removing the electronic shopping cart from a checkout queue.

7. The method of claim 1, further comprising removing the electronic shopping cart from a checkout queue responsive to receiving a user command from the mobile POS device.

8. The method of claim 6, further comprising storing data of the electronic shopping cart prior to the removal of the electronic shopping cart, wherein the data of the electronic shopping cart comprises one or more of: production information of one or more items in the electronic shopping cart, a location of the POS device, a timestamp associated with the electronic shopping cart, a sales attribution value associated with the electronic shopping cart, or a customer profile associated with the electronic shopping cart.

9. The method of claim 1, wherein the transaction task comprises one of: initializing a checkout transaction; processing a checkout process; retrieving or updating an inventory status for one or more products; retrieving customer information; initiating or requesting an order assessment; initiating or requesting an order fulfillment; assigning or updating a sales attribution value; or sending the electronic shopping cart to a remote device for processing.

10. The method of claim 1, wherein the state of the mobile POS device is determined to have changed to the unlocked state, and wherein the transaction task is sending the electronic shopping cart to a remote device for processing, the method further comprising:
   determining a state of the remote device; and
   sending the electronic shopping cart to the remote device responsive to determining that the state of the remote device is unlocked.

11. The method of 10, wherein when the state of the remote device is unlocked, the electronic shopping cart is sent to the remote device with a sales attribution value.

12. The method of claim 1, wherein the mobile POS device comprises a camera, and the method further comprises:
   receiving, by the mobile POS device, the product identifier of the product for updating the electronic shopping cart, wherein receiving the product identifier of the product comprises:
      capturing an image, by the camera, of a machine-readable code associated with the product; and
      determining the product identifier based on the machine-readable code.

13. A system for processing transactions, the system comprising a mobile point-of-sale (POS) device having a processor in communication with a non-transient computer readable medium, the computer readable medium having instructions stored thereon, and the processor configured to, when executing the instructions:
   while a state of the mobile POS device is a locked state:

update an electronic shopping cart based on a received product identifier of a product;
wherein, while the mobile POS is in the locked state, the electronic shopping cart is not associated with any user account;
receive a request for performing a transaction task related to the electronic shopping cart;
responsive to the request for performing the transaction task, determine that the state of the mobile POS device has changed from the locked state to an unlocked state; and
responsive to determining that the state of the mobile POS device has changed from the locked state to the unlocked state, perform the transaction task wherein the transaction task is associated with a user account while the mobile POS is in the unlocked state.

14. The system of claim 13, wherein updating the electronic shopping cart based on the product identifier of the product, while the state of the mobile POS device is the locked state, comprises:
retrieving, from a product database, product information of the product based on the product identifier, the product information including at least a price and a description of the product;
displaying the product information of the product on a display of the mobile POS device as part of the electronic shopping cart;
adding the product to the electronic shopping cart; and
calculating and displaying a total payment amount due for the electronic shopping cart based on the price of the product.

15. The system of claim 13, wherein the processor is further configured to;
in response to the request for performing the transaction task and responsive to determining that the state of the mobile POS device is the locked state, display a message on the mobile POS device requesting authentication information from a user;
responsive to receiving and verifying the authentication information, change the state of the mobile POS device to the unlocked state; and
responsive to the state of the mobile POS device being changed from the locked state to the unlocked state, associate the electronic shopping cart with the user account and perform the transaction task associated with the user account.

16. The system of claim 13, wherein the processor is configured to, prior to receiving the product identifier of the product:
receive an electronic signal to set the mobile POS device to a POS mode; and
responsive to the electronic signal, set a mode of the mobile POS device to the POS mode, wherein the mobile POS device in the POS mode is enabled to receive product identifiers, and wherein a default state of the mobile POS device in the POS mode is the locked state.

17. The system of claim 16, wherein the electronic signal is generated responsive to a press of a key or button of the mobile POS device.

18. The system of claim 13, wherein the processor is further configured to:
detect that the electronic shopping cart has been pending for a defined duration during which the mobile POS device remained in the locked state; and
responsive to detecting that the electronic shopping cart has been pending for the defined duration during which the mobile POS device remained in the locked state, remove the electronic shopping cart from a checkout queue.

19. The system of claim 13, wherein the processor is configured to remove the electronic shopping cart from a checkout queue responsive to receiving a user command from the mobile POS device.

20. The system of claim 18, wherein the processor is further configured to:
store data of the electronic shopping cart prior to the removal of the electronic shopping cart; and
wherein the data of the electronic shopping cart comprises one or more of: production information of one or more items in the electronic shopping cart, a location of the POS device, a timestamp associated with the electronic shopping cart, a sales attribution value associated with the electronic shopping cart, or a customer profile associated with the electronic shopping cart.

21. The system of claim 13, wherein the transaction task comprises one of: initializing a checkout transaction; processing a checkout process; retrieving or updating an inventory status for one or more products; retrieving customer information; initiating or requesting an order assessment; initiating or requesting an order fulfillment; assigning or updating a sales attribution value; or sending the electronic shopping cart to a remote device for processing.

22. The system of claim 13, wherein when the state of the mobile POS device is determined to have changed to the unlocked state, and wherein the transaction task is sending the electronic shopping cart to a remote device for processing, the processor is further configured to:
determine a state of the remote device; and
send the electronic shopping cart to the remote device responsive to determining that the state of the remote device is unlocked.

23. The system of 22, wherein when the state of the remote device is unlocked, the processor is further configured to send the electronic shopping cart to the remote device with a sales attribution value.

24. The system of claim 13, wherein the mobile POS device further comprises a camera, and the processor is further configured to receive, by the mobile POS device, the product identifier of the product for updating the electronic shopping cart, the processor being configured to receive the product identifier of the product by:
capturing an image, by the camera, of a machine-readable code associated with the product; and
determining the product identifier based on the machine-readable code.

25. A non-transitory computer-readable medium storing instructions for processing transactions that, when executed by a processor of a mobile point-of-sale (POS) device, causes the processor to:
while a state of the mobile POS device is a locked state:
update an electronic shopping cart based on a received product identifier of a product;
wherein, while the mobile POS is in the locked state, the electronic shopping cart is not associated with any user account;
receive a request for performing a transaction task related to the electronic shopping cart;
responsive to the request for performing the transaction task, determine that the state of the mobile POS device has changed from the locked state to an unlocked state; and
responsive to determining that the state of the mobile POS device has changed from the locked state to the unlocked state, perform the transaction task wherein the transaction task is associated with a user account while the mobile POS is in the unlocked state.

\* \* \* \* \*